FIG. 30
FIG. 29
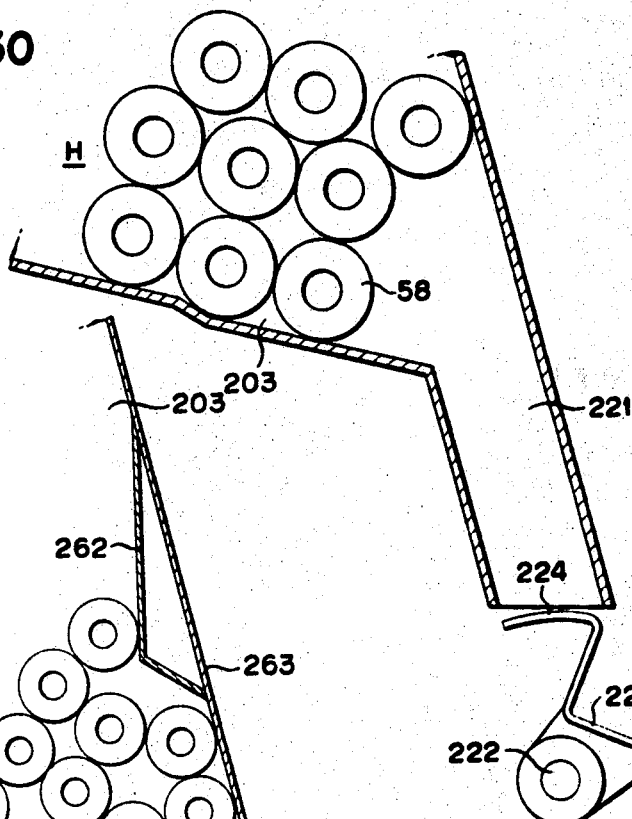
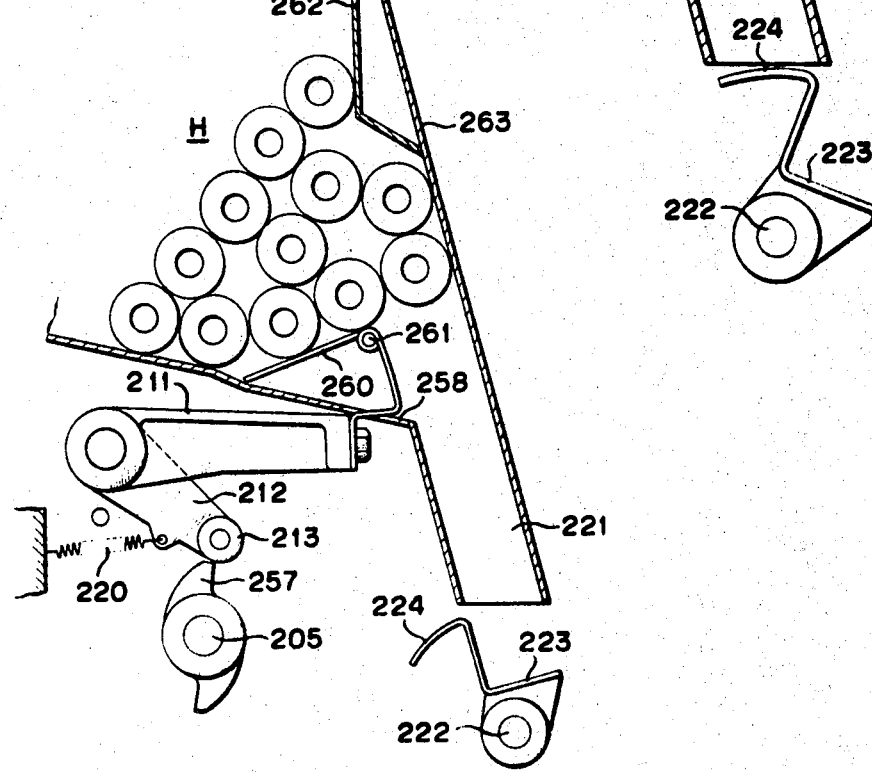

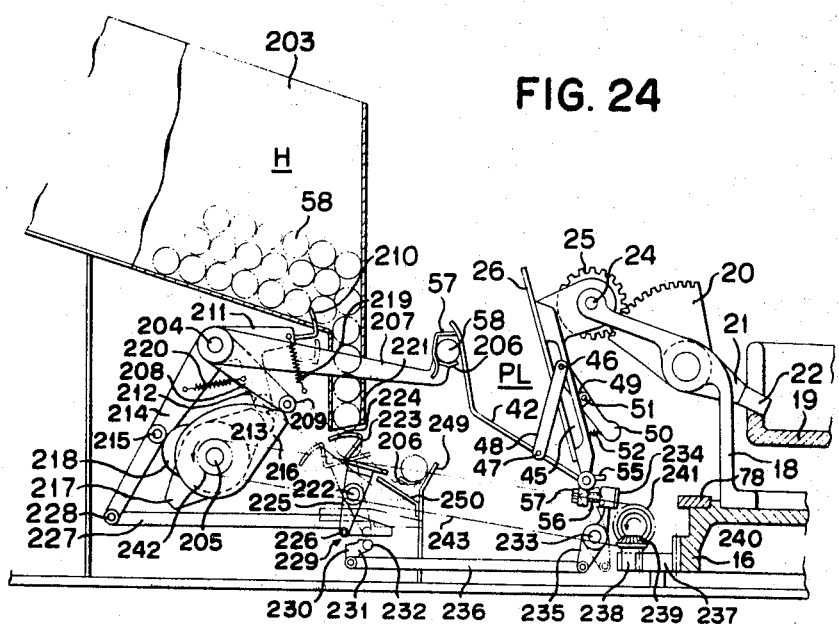
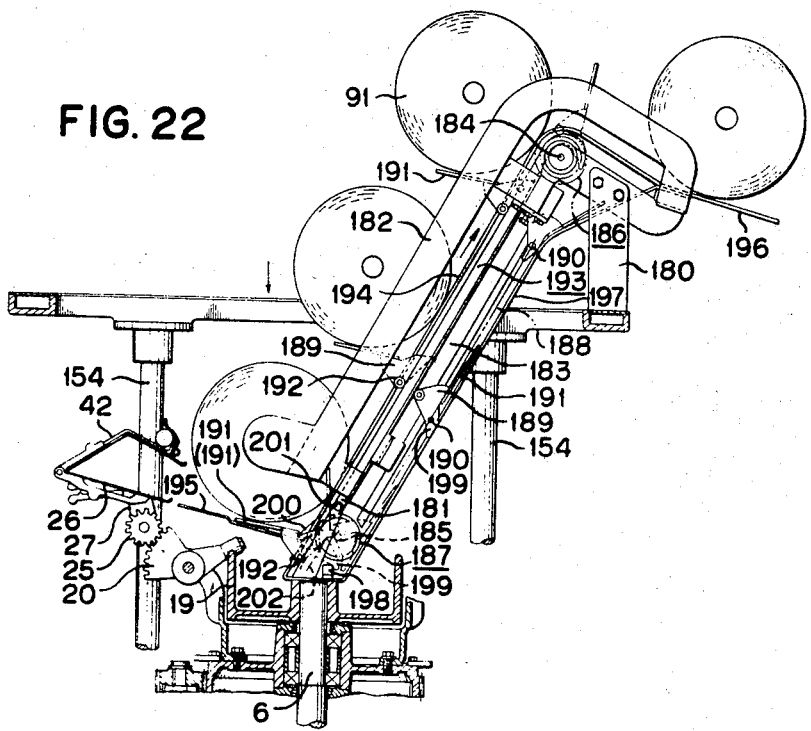

United States Patent Office 3,476,328
Patented Nov. 4, 1969

3,476,328
AUTOMATIC DOFFING APPARATUS OF AUTOMATIC WINDER
Junichiro Shimai, Isamu Matsui, and Syuzo Kawamura, Kyoto-shi, and Syoji Sakai, Kyoto-fu, Japan, assignors to Toyo Boseki Kabushiki Kaisha, Osaka, and Murata Machinery, Ltd., Kyoto, Japan, both companies of Japan
Filed Nov. 22, 1966, Ser. No. 596,124
Claims priority, application Japan, Apr. 8, 1966, 41/22,331
Int. Cl. B65h 54/22
U.S. Cl. 242—35.5          18 Claims

ABSTRACT OF THE DISCLOSURE

An automatic doffing apparatus of the present invention is mounted on an automatic winding machine having a plurality of winding units carried along a closed transport path surrounding the machine. The doffing apparatus is provided with a plurality of doffing units synchronously carried along a closed path disposed inside of the transport path of the winding units and the transferring operation of the packages of full size are transferred from a winding unit to a doffing unit facing the winding unit automatically while conveying the winding unit and the doffing unit. The doffed packages are further carried to out of the winding machine mechanically, bare bobbins are supplied automatically to the winding units from the doffing units while doffing the package from the winding units. The bare bobbins are also supplied to the doffing units automatically from the bare bobbin container while the doffing operation of the winding units is operated.

---

This invention relates to a doffing apparatus for an automatic winder and in particular to doffing apparatus that is fully automatic and provides for the doffing operations necessary to keep the winder operating without interruption.

In recent years, the automation of winders has proved to be one of the key developments in the modernization of the spinning process. Several types of automatic winders have been developed and are now in many spinning mills.

However, generally, the conventional automatic winders, which have been used in the mills, do not have automatic doffing apparatus with accompanying motions such as an empty bobbin-supply motion.

It is the usual practice for the doffing operation to be completed by an operator which retards the modernization of spinning mills.

In the present invention an automatic doffing apparatus is provided with a device for sensing a fully wound bobbin or package on a winding unit, means for driving each of the doffing units in synchronism with a respective one of the winding units, means for winding the end portion of the yarn diagonally around a full cone or cheese of the respective winding unit, means for removing or unloading the full cone or cheese from the respective winding unit, means for delivering the removed cone or cheese to a conveyor, means for supplying a bare or nonwound bobbin to the respective winding unit from which the fully packaged cone or cheese has been wound, means for leading an end of the feed yarn from the supply cop which is supported at the lower portion of each winding unit, means for carrying the doffed cone or cheese out of the winding machine to the above-mentioned conveyer and means for supplying a nonwound bobbin to the unloaded doffing unit.

Therefore, an object of the present invention is to provide an automatic doffing apparatus for an automatic winder thereby to provide a fully automatic winding operation.

Another object of the present invention is to provide automatic doffing apparatus which provides precise, continuously available doffing for the winding units.

A further object of the present invention is to provide a smaller doffing unit to reduce the amount of installation space required.

A still further object of the present invention is to provide in a fully automated winding machine and connected automatic doffing apparatus an automatic conveyer, whereby the automatic conveyer receives the packaged bobbin for delivery to a receptacle for shipping.

With the above and additional objects and advantages in view as will hereinafter appear, this invention comprises the devices, combinations and arrangements of parts hereinafter described and illustrated in the accompanying drawings of preferred embodiments thereof.

Figure 1:
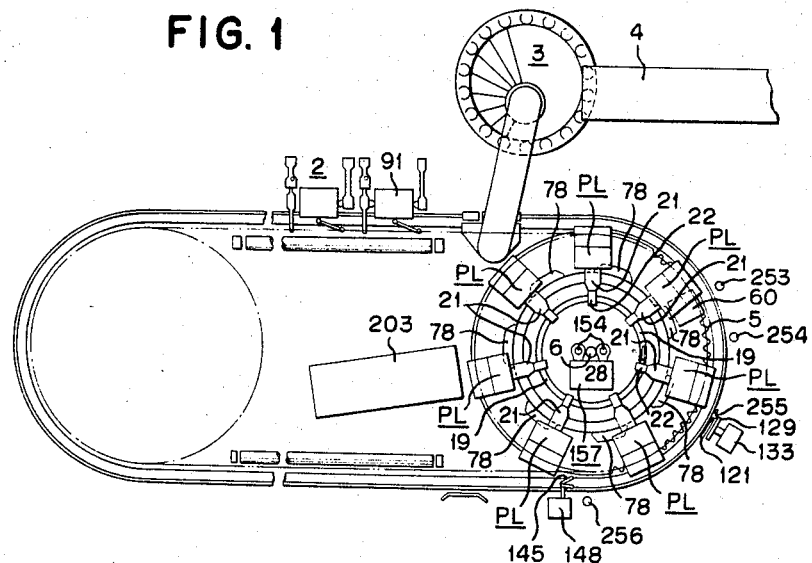
Figure 2:
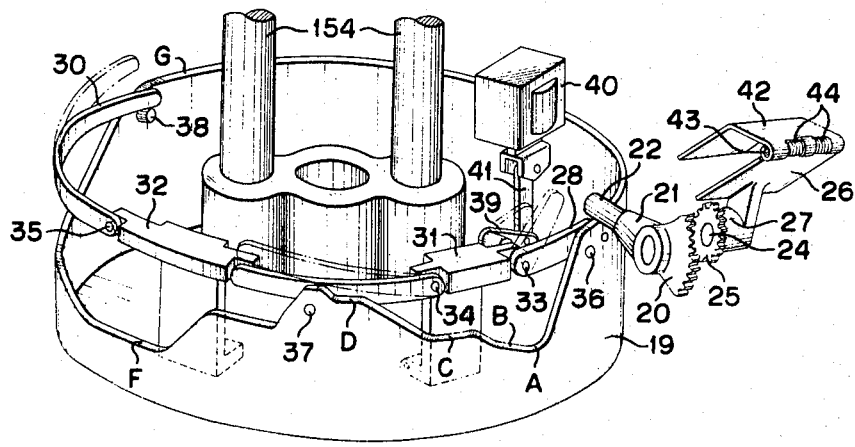
Figure 3:
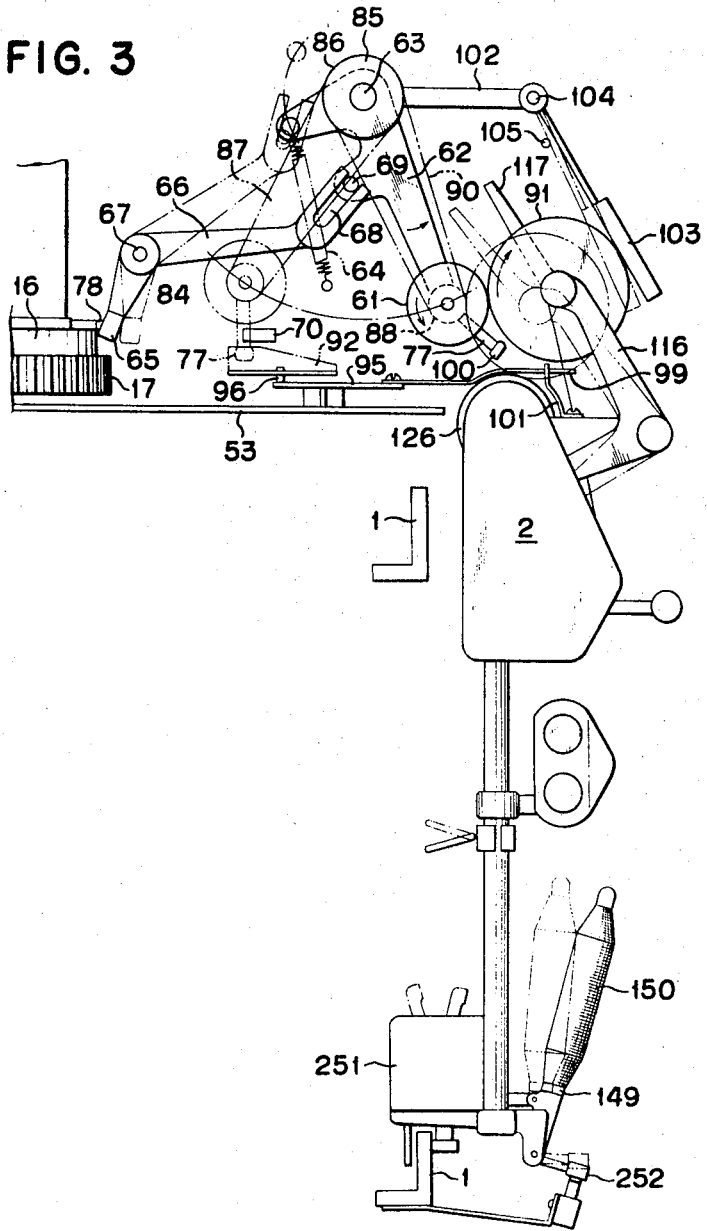
Figure 4:
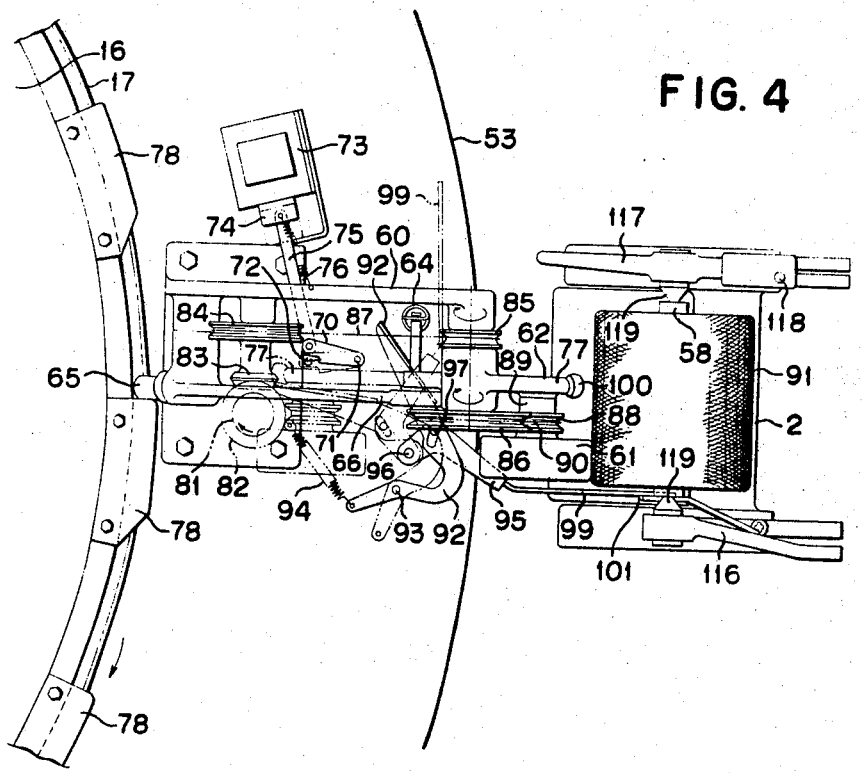
Figure 6:
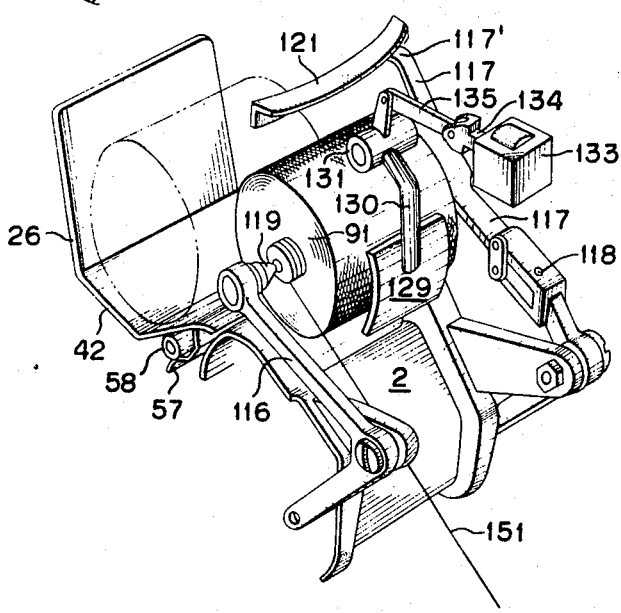
Figure 5A:
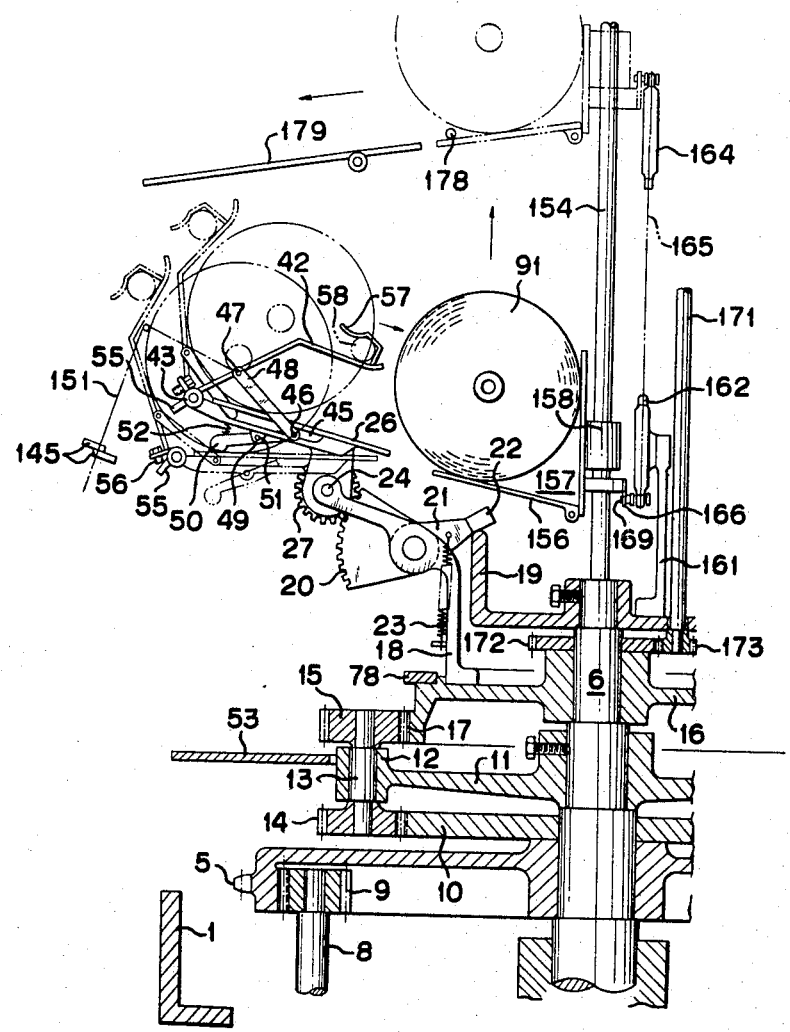
Figure 5B:
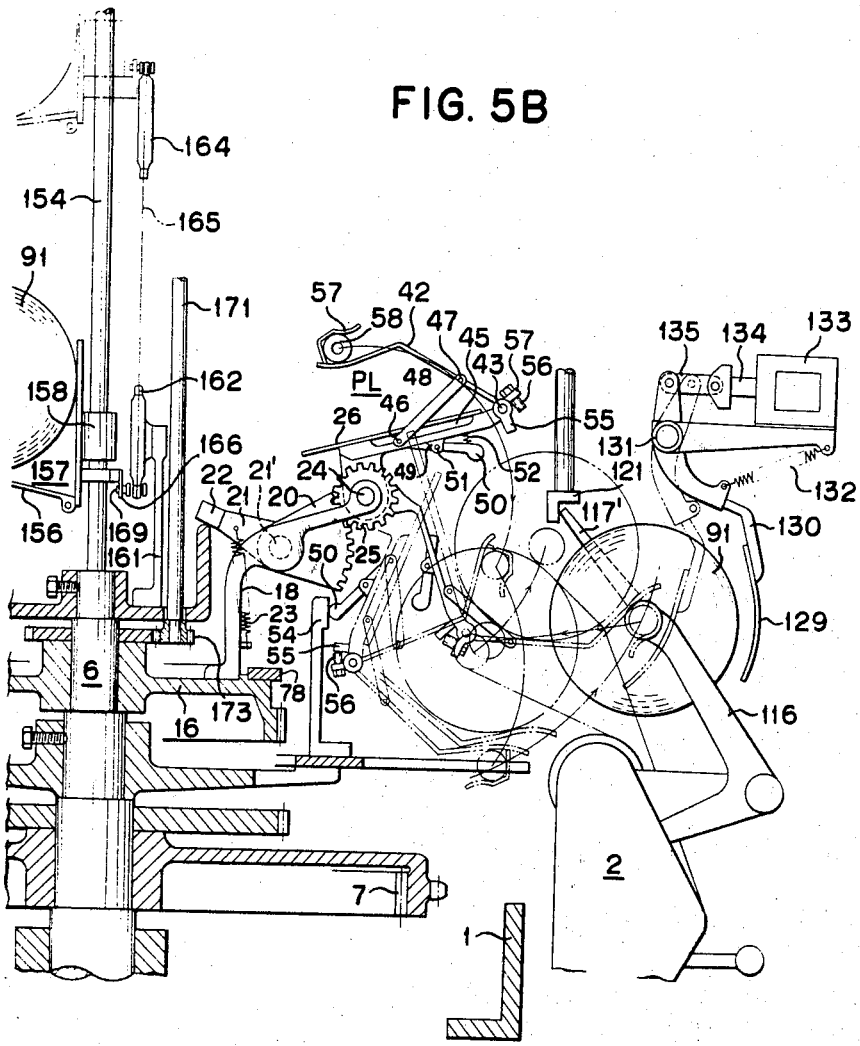
Figure 7:
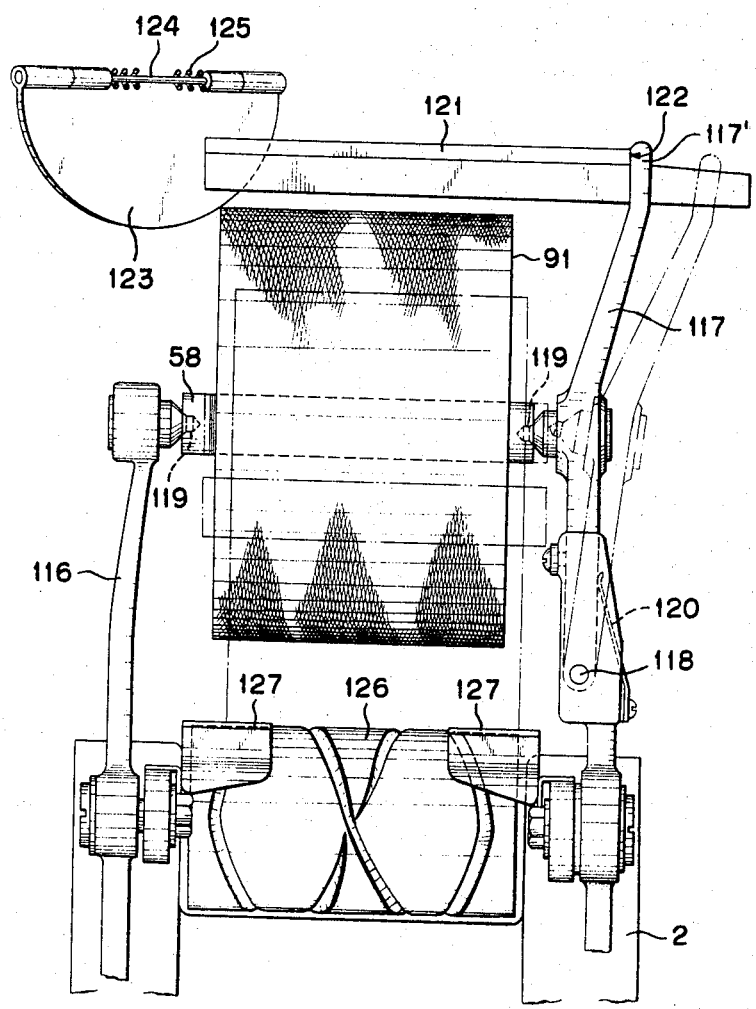
Figure 8:
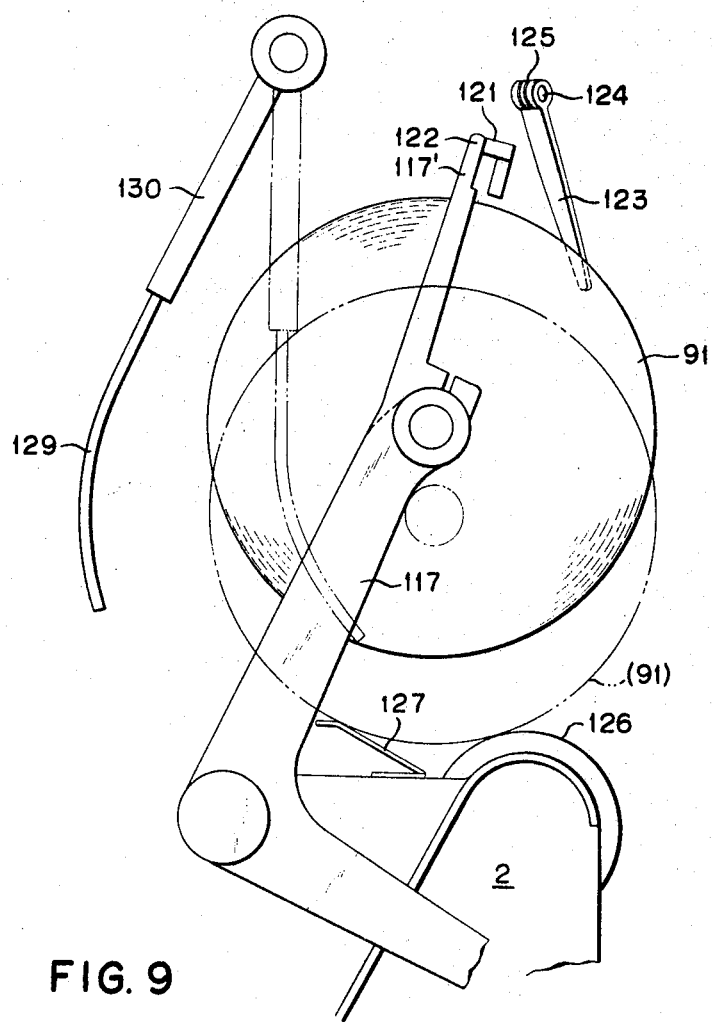
Figure 9:
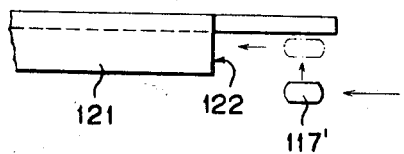
Figure 10:
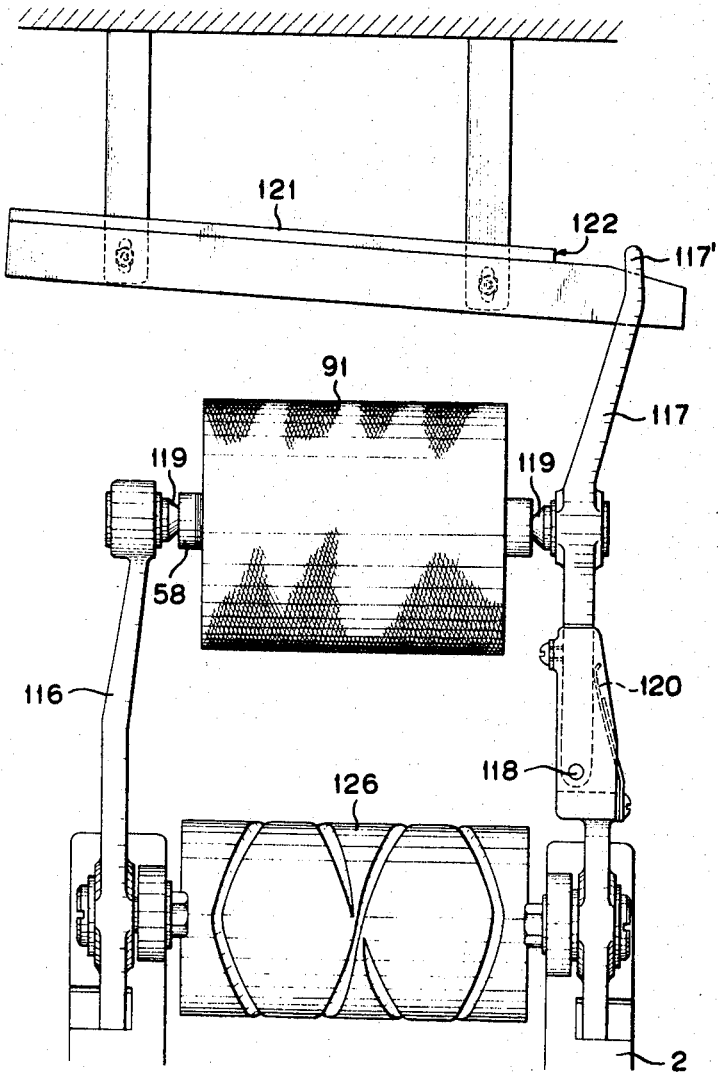
Figure 11:
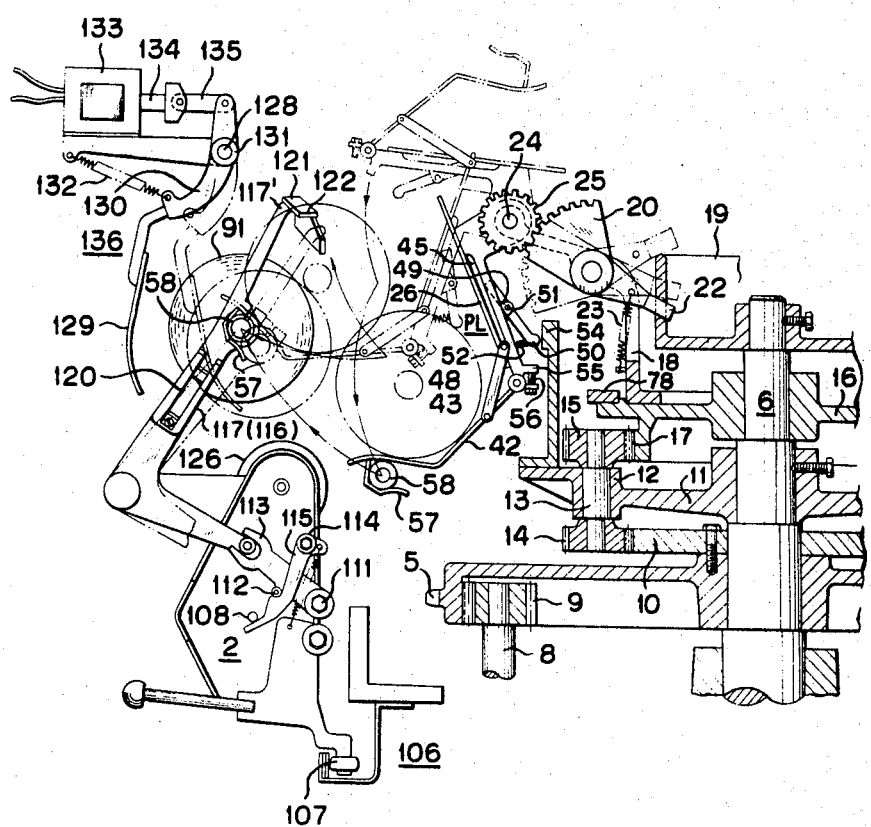
Figure 12:
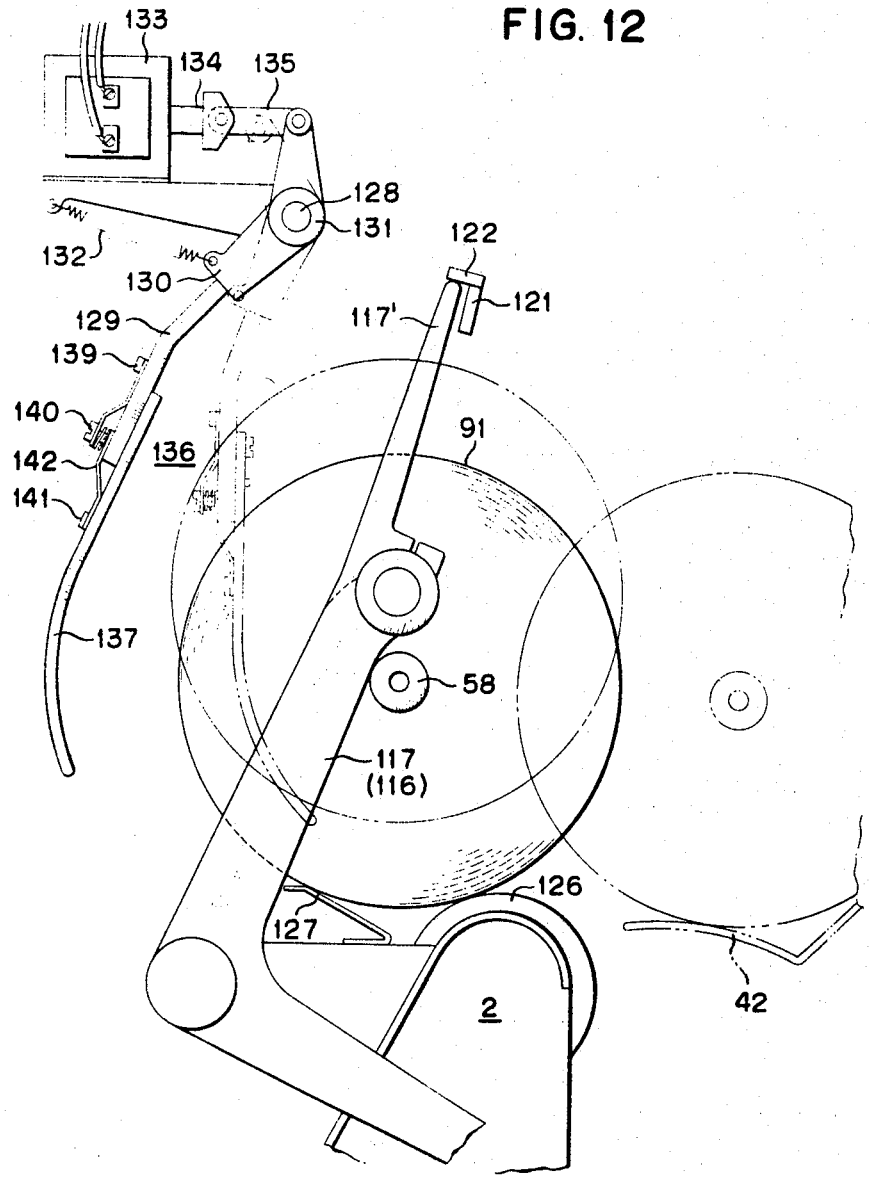
Figure 13:
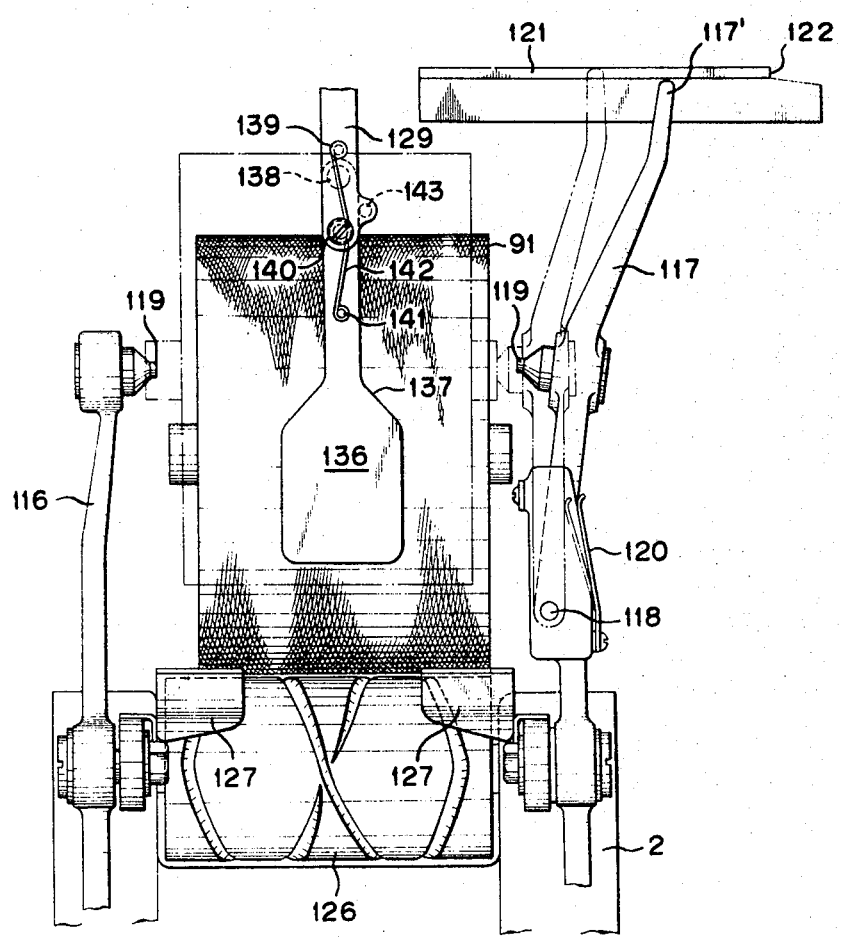

FIG. 1 is an essentially diagrammatic plan view showing an embodiment of an automatic doffing apparatus attached to an automatic winder according to the present invention, FIG. 2 is a perspective view of the circular end cam used for the automatic doffing apparatus of FIG. 1, FIG. 3 is an elevational view of a portion of the doffing and winding apparatus showing the condition of a package of yarn supported on a winding unit when an end of the yarn is wound by the winding unit across the package and around an end of the bobbin on which the package is wound, according to the automatic doffing apparatus of FIG. 1, FIG. 4 is a fragmentary plan view the doffing apparatus showing the package of yarn when yarn is led to an end of the bobbin on which the package is wound, according to the doffing apparatus of FIG. 1, FIGS. 5A and 5B are elevational views partly in section of portions of the doffing and winding apparatus which illustrate motions of the doffing unit according to the present invention, FIG. 6 is a perspective view of the winding unit as the package on the winding unit is being shifted to its respective doffing unit, according to the present invention, FIG. 7 is an elevational view of a part of the doffing apparatus which shifts the package on the winding unit from a pair of cradle arms of the winding unit, according to the present invention, FIG. 8 is a side elevational view of the device shown in FIG. 7, FIG. 9 is a fragmentary plan view of the main portion of a rail-cam which actuates the turning motion of one of the cradle arms of FIG. 7, FIG. 10 is an elevational view to show another device which shifts the package on the winding unit from a pair of cradle arms of the winding unit, according to the present invention, FIG. 11 is an elevational view partly in section of the doffing apparatus which illustrates a displaced condition of the cradle arm by an action of the device shown in FIG. 10, FIGS. 12 and 13 are front and side elevational views of a device which shifts a package supported on a winding unit to a doffing unit, according to the present invention.

Figure 14:
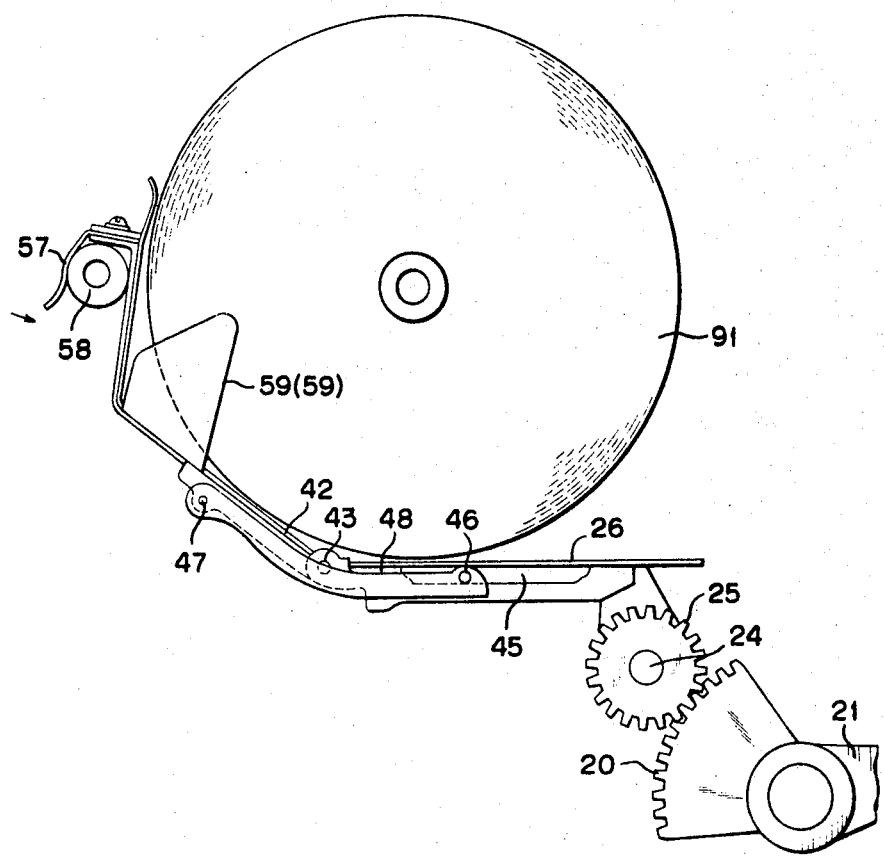
Figure 15:
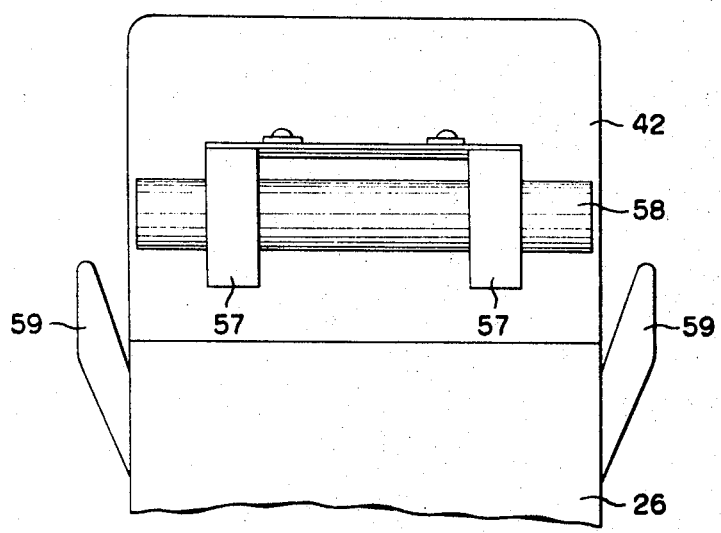
Figure 16:
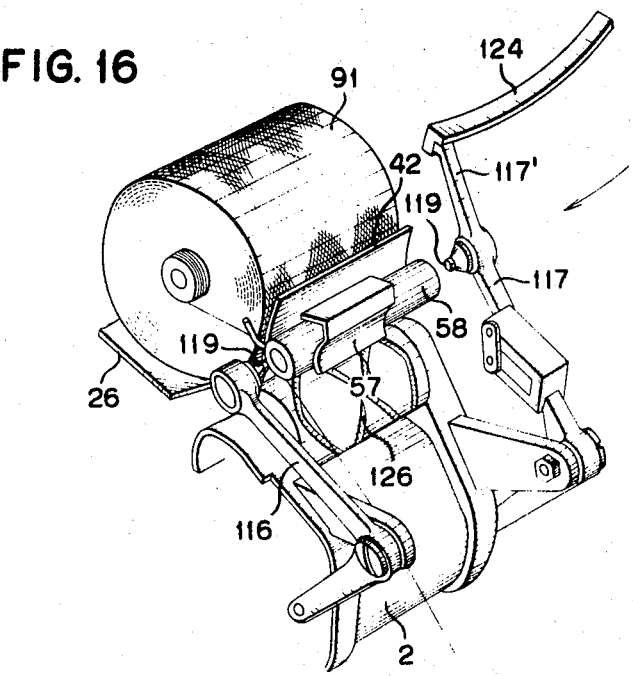
Figure 17:
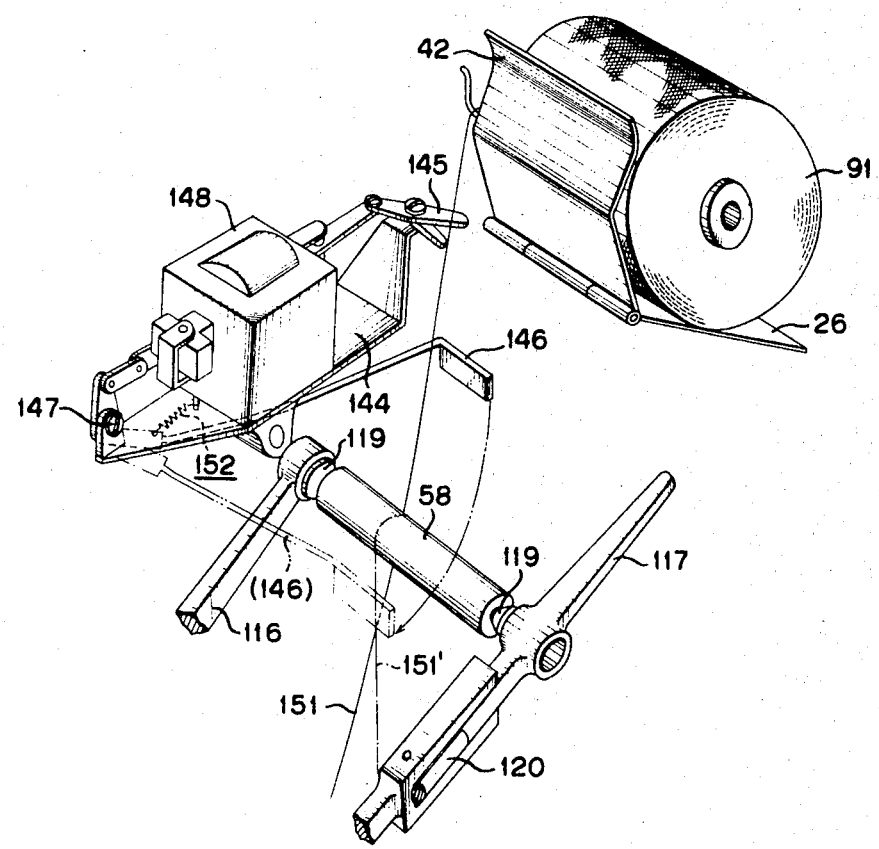
Figure 18:
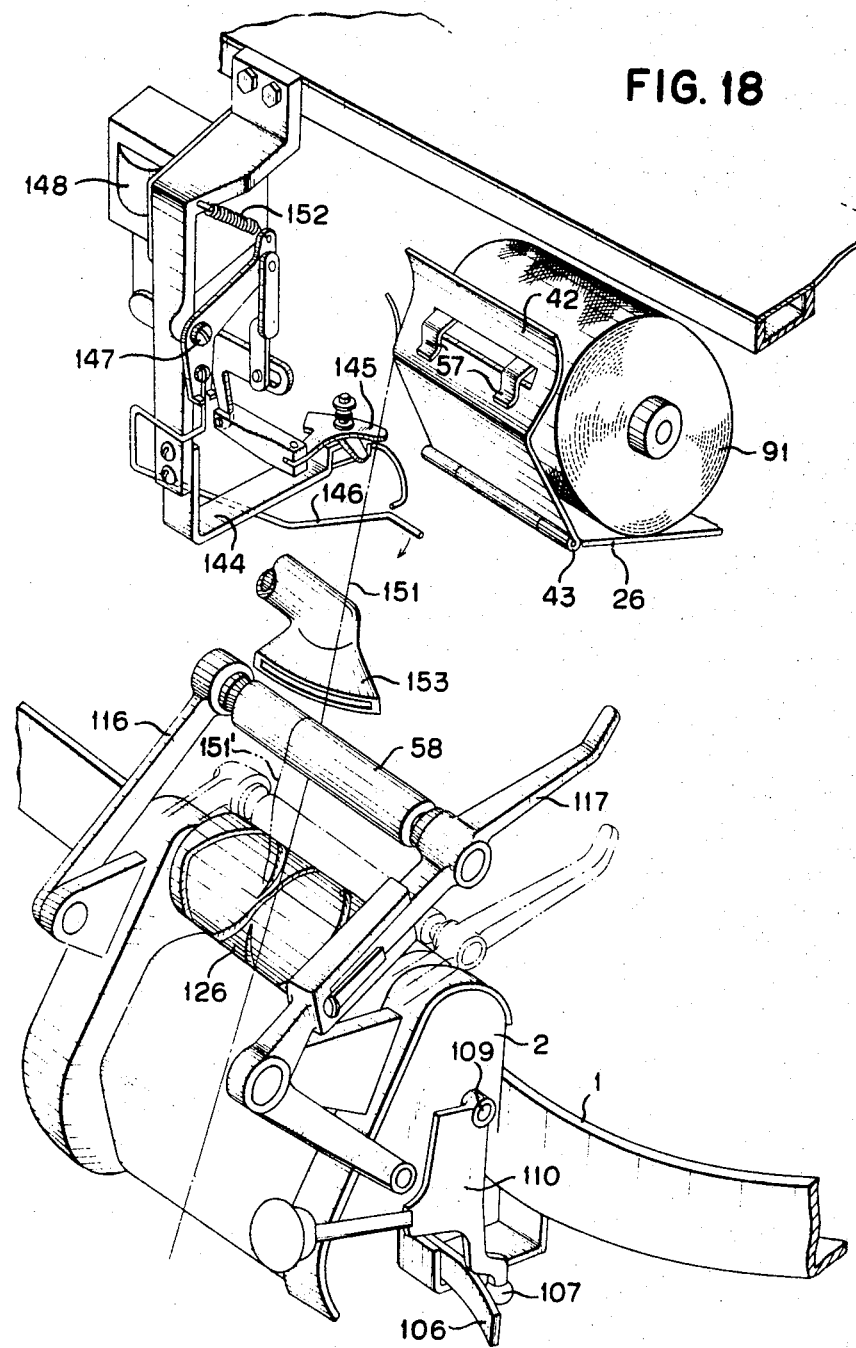
Figure 19:
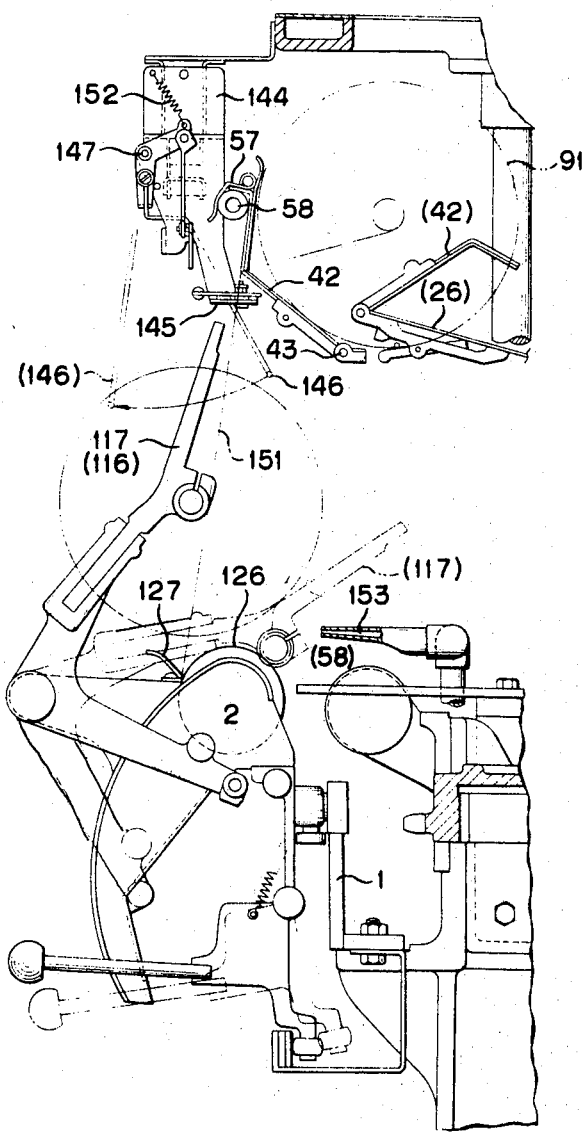

FIG. 14 is an elevational side view of a portion of the doffing apparatus which illustrates a catch plate for receiving a package of the doffing unit, according to the present invention, FIG. 15 is a bottom view of an end portion of the catch plate, seen from the direction of the arrow in FIG. 14, FIG. 16 is a perspective view of a portion of the doffing and winding apparatus showing an empty bobbin being supplied to a pair of cradle arms of the perspective winding unit, according to the present invention, FIG. 17 is a perspective view of a device of the present invention for leading a yarn from a cop end to an empty bobbin supported by the cradle arms of the winding unit after cutting the yarn between the cop vertically supported on the respective winding unit and a package shifted from the respective doffing unit, FIGS. 18 and 19 are perspective and elevational side views respectively, of another device that perform the same function as that shown in FIG. 17, according to the present invention.

Figure 20:
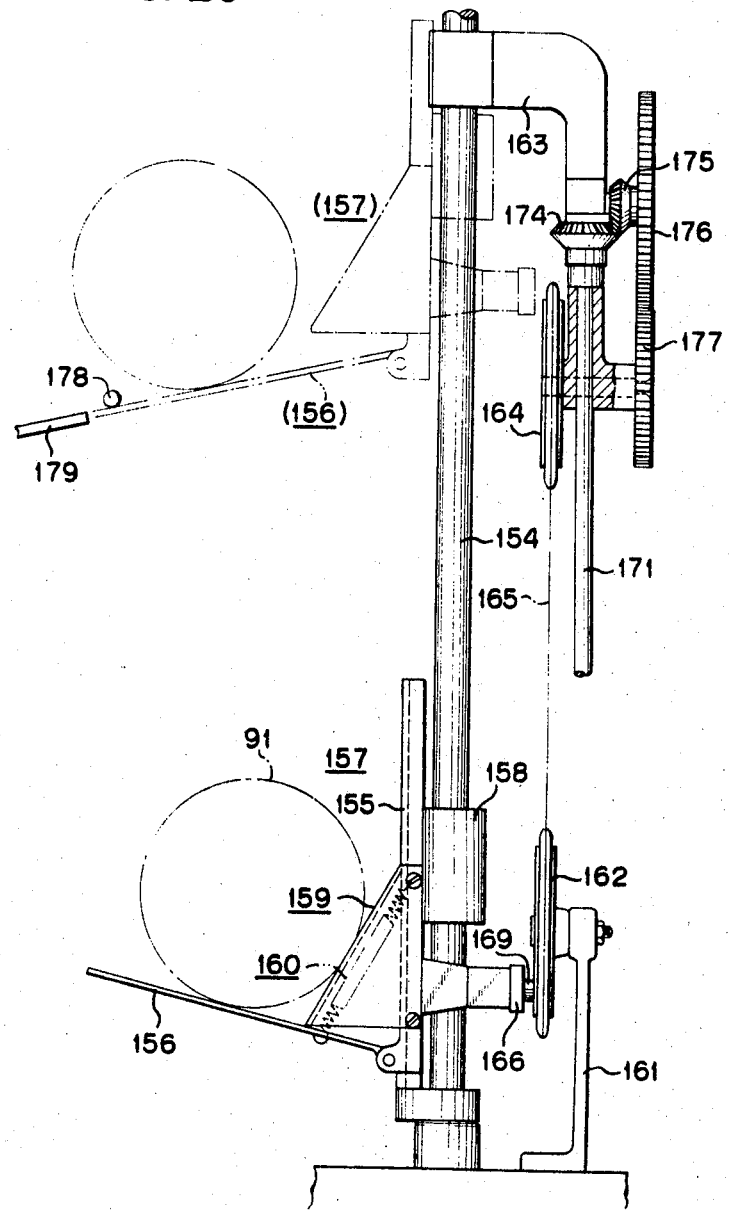
Figure 21:
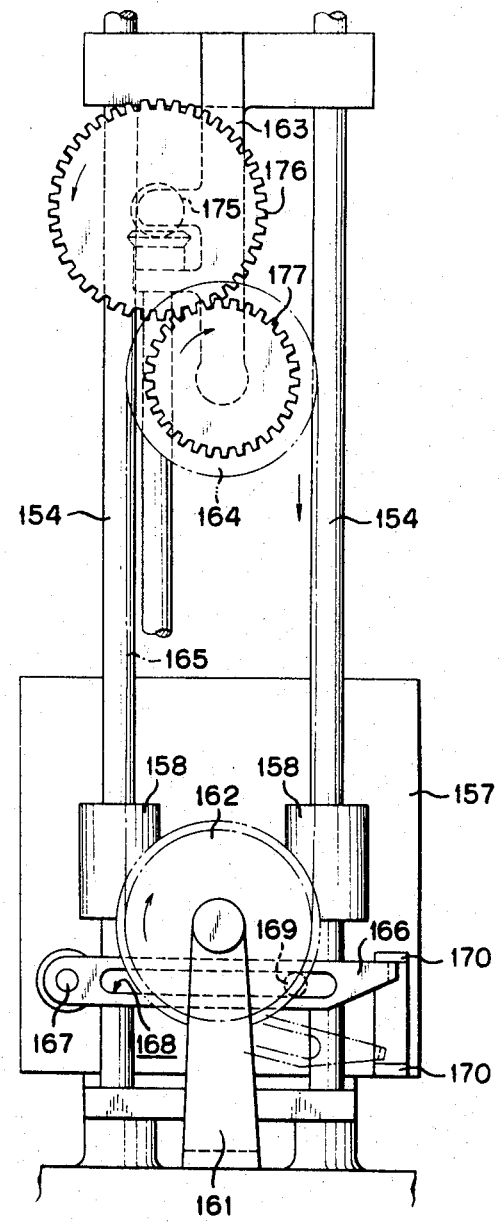
Figure 23:
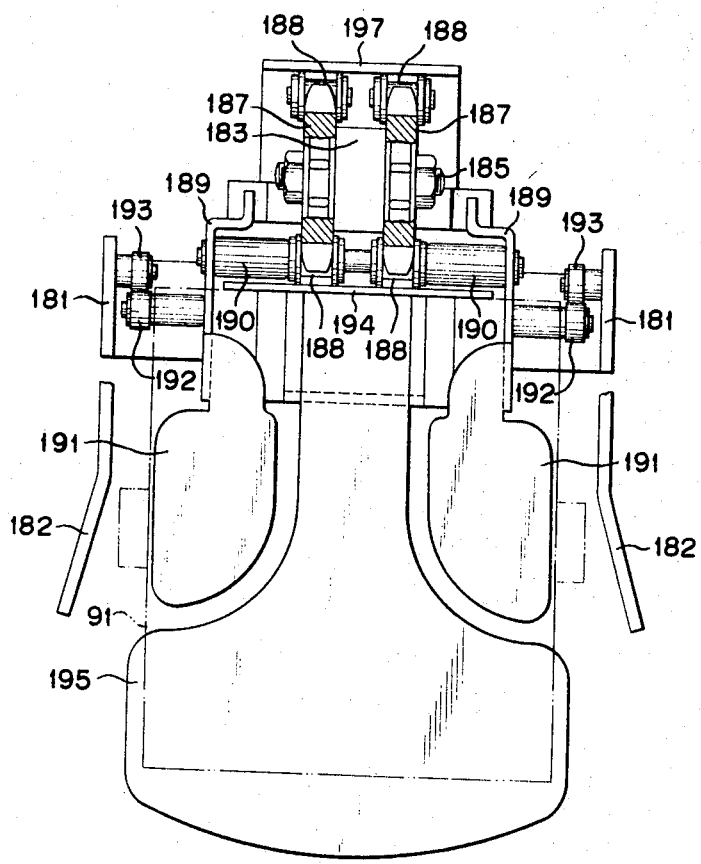
Figure 25:
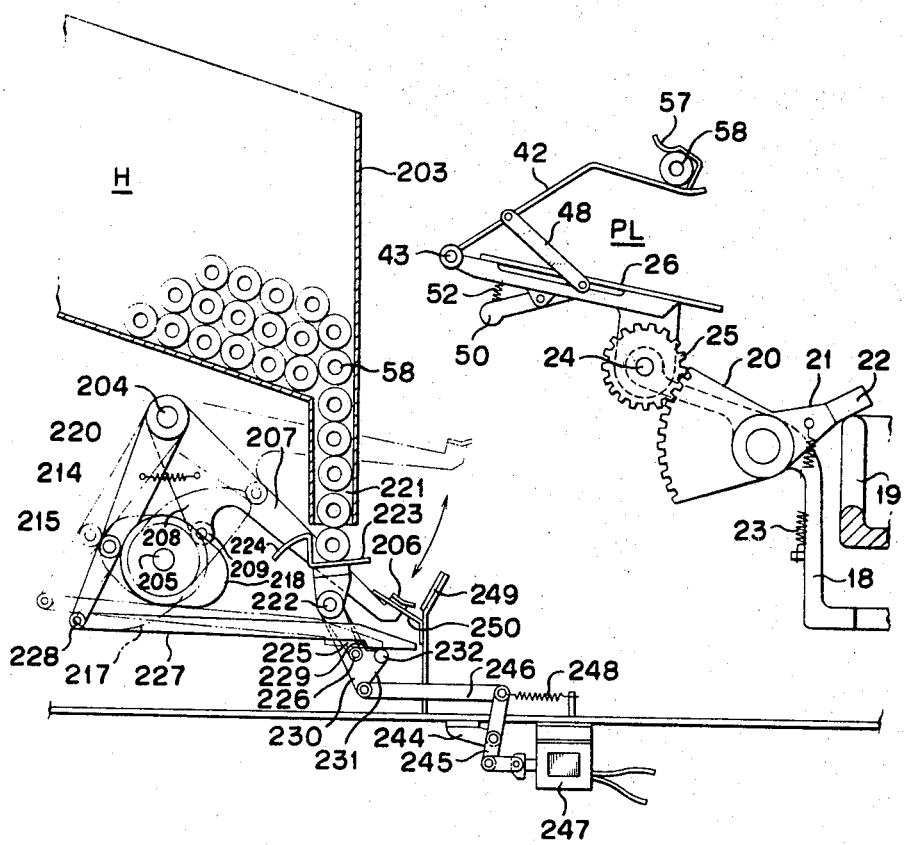
Figure 26:
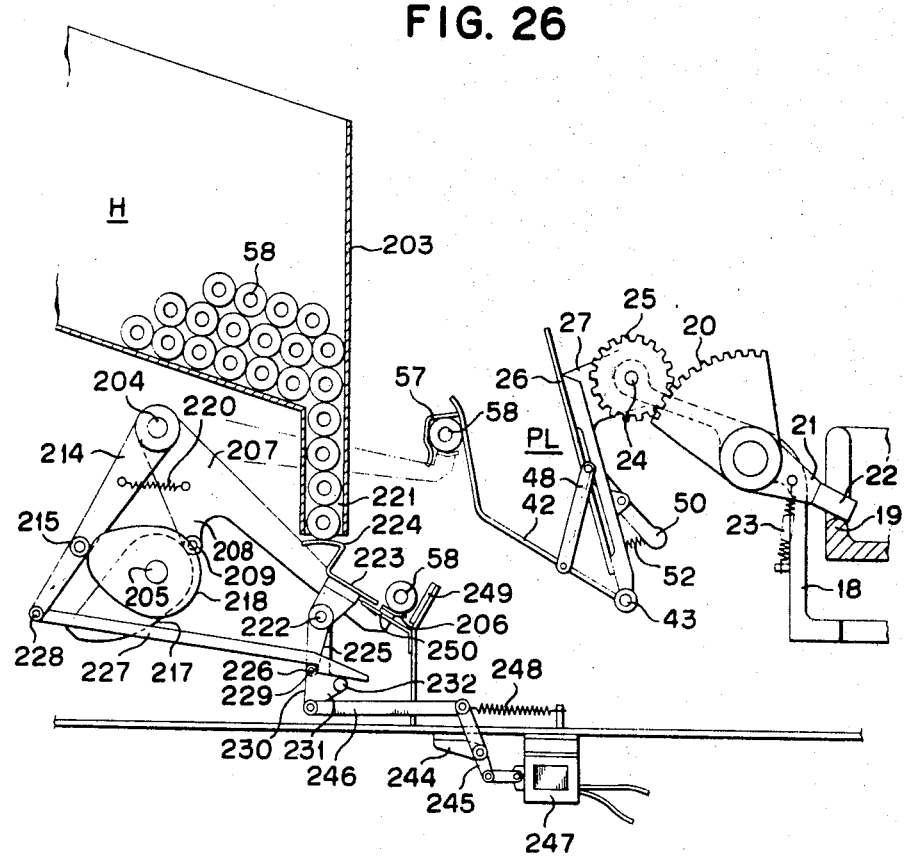
Figure 27:
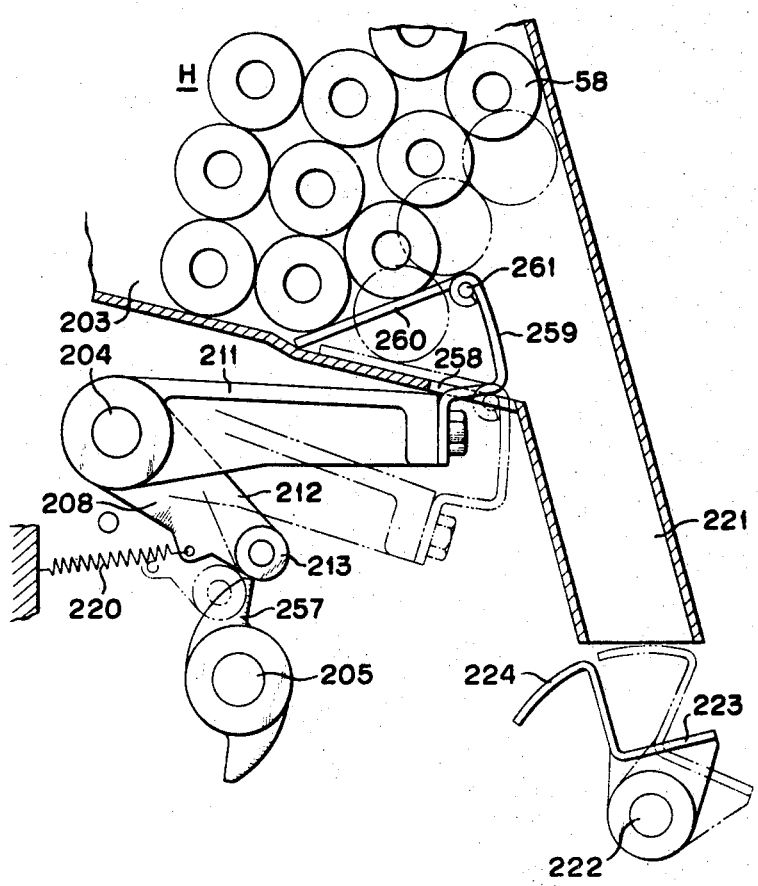
Figure 28:
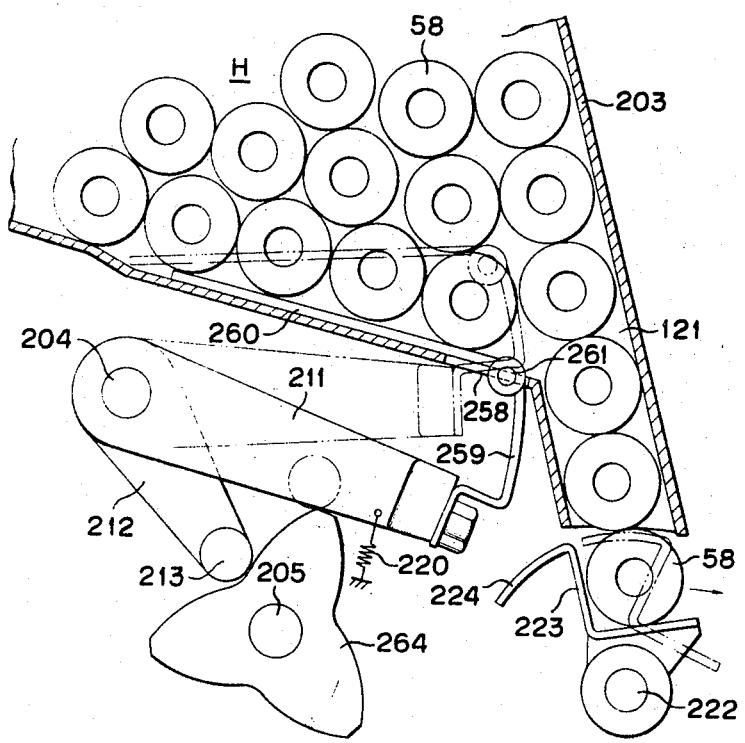

FIGS. 20 and 21 are elevational side views of a device of the present invention for carrying a package shifted onto the respective doffing unit out of the winding machine, FIG. 22 is an elevational side view of another device of the present invention to perform the same function as that shown in FIG. 20, FIG. 23 is a plain view of a lifting device of the device as seen in the direction of the vertical arrow in FIG. 22, FIG. 24 is an elevational vertical view partially in section of the device for supplying a nonwound bobbin to a winding unit, according to the present invention, FIG. 25 is an elevational view partly in section of another mechanism that shows a gate plate for a nonwound bobbin of the supplying device shown in FIG. 25, FIG. 26 is an elevational view partly in section of the bobbin supply device shown in FIG. 25, with the gate plate in a different position, FIG. 27 is an elevational view partly in section of a mechanism which prevents the formation of a bridge of nonwound bobbins at the entrance of the exit passageway of the nonwound bobbins in the nonwound bobbin storage container, according to the present invention, FIG. 28 is an elevational view partly in section of another mechanism having the same functional features as that of the mechanism shown in FIG. 27, FIG. 29 is an elevational view partly in section of the mechanism shown in FIG. 27 and including an additional wall disposed above the exit passageway of the nonwound bobbin storage container, according to the present invention, FIG. 30 is an elevational view partly in section of a portion of the mechanism in FIGS. 27–29 showing a bridging condition at a joint adjacent to the nonwound bobbin exit passageway of the nonwound bobbin storage container, according to the present invention.

According to the doffing apparatus of this invention, when each package of the winding units, which are travelling along a guide rail and simultaneously winding yarn, become fully packaged, doffing units which travel in synchronism with the winding units are actuated after sensing the fully packaged or wound bobbin on a winding unit, so as automatically to doff the fully packaged cone or cheese on the winding unit, and automatically carry the doffed cheese or cone out of the winding machine.

An embodiment of the doffing apparatus according to the invention comprises, a plurality of doffing units having a catch plate unit including an upper catch plate having a nonwound bobbin holder and a lower catch plate which is pivotably connected to the upper catch plate for folding relatively to the upper catch plate, a mechanism for driving the doffing units in synchronism with the winding units, a cam mechanism for providing the catch plates of the doffing units with a lifting motion at a predetermined position to open and close the catch plates, a mechanism for winding a yarn end around an end of a packaged or wound bobbin while the packaged bobbin supported on the winding moves from a driving drum of the winding unit, a cam mechanism having the shape of a rail which includes an angled portion adapted to cause the removal of a packaged bobbin supported by a pair of cradle arms, a mechanism for moving the packaged bobbin taken off the cradle arms to the respective doffing unit, means for mounting automatically a nonwound bobbin held by a nonwound bobbin holder of the respective doffing unit on a pair of cradle arms of the respective winding unit, a mechanism for cutting yarn between a cop vertically supported by a peg of the winding unit and a packaged bobbin shifted to the doffing unit, and for leading the cut end of the yarn around a nonwound bobbin supplied to the respective winding unit, a mechanism having a lift for carrying a packaged bobbin shifted onto the respective doffing unit from the winding unit and a mechanism for supplying a nonwound bobbin to the respective doffing unit.

The detailed construction and the operation of the above-mentioned mechanism are hereinafter explained by reference to the accompanied drawings.

General arrangement of the driving mechanisms.

Referring to FIGS. 1, 2, 5A and 5B winding units 2 are made to travel along a looped rail 1. A magazine 3 supplies new cops to an automatic winder from an automatic cop supply apparatus 4 in the same way as conventional automatic winders. Means for driving a plurality of winding units 2 on an endless chain (not shown) driven by a sprocket wheel 5 is operated in a manner well known to those versed in the art.

In FIGS. 5A, 5B, the sprocket wheel 5 is rotatably mounted on a main shaft 6, and an internal gear 7 mounted on the inside of the sprocket wheel 5 meshes with a pinion 9, secured to the upper end portion of a driving shaft 8, to drive the sprocket wheel 5.

Doffing brackets 18 of doffing units PL are mounted on a circular disc 16 at spaced intervals equal to the spaced intervals of the adjacent brackets of the winding units 2. The circular disc 16 is supported by the main shaft 6 for rotation on the shaft 6. A spur gear 10 is mounted on the main shaft 6 for rotation with the sprocket wheel 5 on the main shaft 6 and meshes with a pinion 14 secured to the bottom portion of a vertical shaft 13. The vertical shaft 13 is rotatably supported by a bearing 12 integrally formed on an end portion of a bracket 11, which is rigidly secured on the main shaft 6. A helical pinion 15 rigidly mounted on the upper portion of the bearing 12 is meshed with a helical gear 17 disposed on the circumferential surface of the circular disc 16. By the above-mentioned gearing, the doffing brackets 18 are rotated around the main shaft 6. A circular end cam 19 is secured to the upper portion of the main shaft 6, a segment gear 20 is mounted on a shaft 21' mounted on the middle portion of each bracket 18 and a roller 22 is disposed on an end of an inwardly (towards shaft 6) directed elongated lever 21 which forms a base portion of the segment gear 20. The roller 22 of each segment gear 20 is arranged to contact the upper cam surface of the circular end cam 19 due to the spring pressure of a spring 23 secured by one end to the lever 21 and by the other end to the bracket 18. A rotatable shaft 24 is horizontally supported at the free end portion of the arched bracket 18, a pinion 25 is secured on the revolving shaft 24 so as to mesh with the segment gear 20, and a boss 27 of an upper catch plate 26 of the doffing unit is also secured on the revolving shaft 24, whereby, when the lever 21 is pivoted on the shaft 21', while the lever 21 is driven around the circular end cam 19 by the rotation of the circular disc 16, the segment gear 20 rotates the meshed pinion 25 a certain angle, whereby the upper catch plate 26 pivots on the revolving shaft 24.

Cam mechanism for controlling the motion of the catch plate of a doffing unit

As seen in FIG. 2, the upper cam surface of the circular end cam 19 includes an undulating section and a non-undulating section located solely in one plane. Therefore, when the roller 22 of the lever 21 contacts the non-undulating section the segment gear 20 does not pivot but when the roller 22 of the lever 21 contacts the undulating section the lever 21 pivots on the shaft 21' as it follows the undulations of the cam section whereby the segment gear 20 rotates clockwise or counterclockwise and the upper catch plate 26 of the doffing unit is pivoted by the shaft 24 to provide a lifting motion.

As clearly shown in FIG. 2, three straight rod cams 28, 29, and 30, and two connecting cams 31 and 32 are disposed inside and along the undulating section of the circular end cam 19 in the following sequence: 28, 31, 29, 32 and 30. An end of the first straight rod cam 28 is secured on a pin 33 rotatably mounted on an end of the connecting cam 31, the second straight rod cam 29 is pivoted on the other end of the connecting cam 31 by a pin 34 and the third straight rod cam 30 is pivoted on an end of the connecting cam 32 by a pin 35. The connecting cams 31 and 32 are secured on a base portion of the circular end cam 19 at the same level as the non-undulating section of the circular end cam 19. A free end of the first straight cam 28 is supported by a pin 36 secured on the undulating section of the circular end cam 19. The second straight cam 29 is supported by a pin 37 disposed on the undulating section of the circular end cam 19 so as to be supported horizontally, and the third straight cam 30 is also supported by a pin 38 disposed on the undulating section of the circular end cam 19 so as to be supported horizontally. Therefore, the three straight cams 28, 29 and 30 and the two connecting cams 31, 32 form a horizontal connected surface at the same level as the non-undulating section of the circular end cam 19. The bottom end of a connecting rod 41 of a solenoid 40 is pivoted to an end of a lever 39 which is rigidly secured on the pin 33. Therefore, when the solenoid 40 is operated, so as to pull the connecting rod 41 upwardly, the free end of the straight cam 28 is shifted upward so as to pivot upwardly away from the circular end cam 19, as shown by dotted line in FIG. 2. When this happens the roll 22 of the lever 21 can slide along the cam portions A, B, C, D, E and F of the undulating section of the circular end cam 19. The roll 22 passes under the free end of the straight rod cam 28, when it slides along the upwardly inclined portion C of the circular end cam 19, and the roll 22 pushes the second rod cam 29 upwardly so as to pivot the cam 29 on the pin 34 as shown by the dotted line in FIG. 2, then the roll 22 passes the top end cam portion E of the circular end cam 19 and down towards the cam portion F. As the free end of the second straight rod cam 29 is shifted upwardly so as to break the connection between the free end of the connecting cam 32 and the straight rod cam 29, the roll 22 can slide along the downwardly inclined cam portion of the circular end cam 19 to F. While the roll 22 slides along the upwardly inclined cam portion of the circular end cam 19 from F to G, the roll pushes the free end of the third straight rod cam 30 as shown by the dotted line in FIG. 2. While the winding units are operating before they are fully packed, the solenoid 40 does not operate, therefore, the three straight rod cams 28, 29, and 30 are kept in a horizontal position so as to form a horizontal guide surface comprising the three straight rod cams 28, 29 and 30, and two connecting cams 31 and 32, therefore, the roller 22 slides along the above-mentioned horizontal guide surface and the non-undulating cam section of the circular end cam 19. Thus, the segment gear 20 does not pivot on the shaft 21' while the roller is sliding along the above-mentioned horizontal guide surface and the non-undulating section of the circular end cam.

Mechanism of the catch plate of the doffing unit

A catch plate for each doffing unit comprises the upper catch plate 26 and a lower catch plate 42 having a curved shape as shown in FIG. 2. The base portion of the lower catch plate 42 is articulated to the top end of the upper catch plate 26 by an articulate shaft 43. A spring 44 disposed on the articulate shaft 43 provides the lower catch plate 42 with a tendency to fold over upon the upper catch plate 26, as shown by the full line in the drawings of FIG. 5. Elongated slits 45 are disposed at both sides of the upper catch plate 26 and the free ends of links 48 are articulated to a pin 46 received by the elongated slits 45, and the other end of the links 48 are pivoted on a pivot pin 47 disposed on the central edge portion of the lower catch plate 42. A central portion of a stop lever 50 is pivoted on a pin of a downwardly projecting boss 49 of the upper catch plate 26 by a pivot 51, a hook-shaped free end of the stop lever 50 being engaged with the pin 46 by means of a spring 52 so as to prevent the lower catch plate 42 from opening during the time when the upper catch plate 26 is shifted downwardly while turning around the revolving shaft 24.

As best seen in FIGS. 5a and 5b the bracket 11 supports a sprocket cover 53 horizontally and a cam 54 is disposed vertically at a predetermined position of the sprocket cover 53 so as to control the turning motion of the stop level 50. A depending stop piece 55 is disposed at a free end portion of the upper catch plate 26 and a set bolt 56 is secured to a boss formed on the lower catch plate 42, whereby, when the lower catch plate 42 is shifted downwardly a predetermined distance for opening itself, the set bolt 56 is contracted by the stop piece 55 for controlling the opening condition of the lower catch plate 42. During the above-mentioned opening motion, the spring 44 works as a shock absorber for absorbing the impact of the plate 42 due to the weight of the lower catch plate 42. A bobbin holder 57 is mounted on the free end portion of the upper catch plate 42. The bobbin holder 57 is made of a spring steel plate so as to hold an empty or nonwound or bare bobbin 58 by the resilient force of the holder. A pair of upwardly projecting package-catch plates 59 (shown in FIG. 14) are mounted on both sides of the lower catch plate 42.

Means for winding the yarn end around an end of a fully packaged or yarn wound bobbin Referring to FIGS. 3 and 4, a bracket 60 is mounted on the sprocket cover 53 and an arm 62 is pivoted on a lower portion of the front end of the bracket 60 by a pivot shaft 63. A driven roller 61 for driving a yarn package is supported by the arm 62 and a spring 64 pulls an end of the arm 62 so as to tend to rotate the arm 62 counterclockwise, as seen in FIG. 3. A fork lever 66 having a roller 65 at its lower end is pivoted on a pivot shaft 67 and a forked portion 68 of the fork level 66 engages a projecting pin 69 extending from a side surface of the arm 62. At a stationary position of the arm 62, a stop lever 70 is pivoted on a horizontal plane on a pivot 71 by the action of a plunger 74 of a solenoid 73 which is connected to the front end of the stop lever 70 by a rod 75 which is connected with a spring 76. A hooked portion 72 of the stop lever 70 is positioned in the path of the arm 62 when the solenoid 73 is not energized, on the other hand, the hooked portion 72 of the lever 70 engages a small arm 77 projecting from the lower portion of the arm 62 when the arm 62 is positioned as shown by the dotted line in FIG. 3.

A plurality of cams 78 are secured to the circumferential edge portion of the circular disc 16 with the same spaces therebetween as that of the plurality of doffing units PL. When the circular disc 16, which rotates synchronously with that of the doffing units PL, revolves and the cam 78 presses the roll 65, the fork lever 66 turns counterclockwise (FIG. 3) around the shaft 67, whereby the fork portion 68 of the lever 66 pulls the pin 69 so as to turn the arm 62 clockwise around the shaft 63, as shown by the dotted line in FIG. 3.

The revolution of the main shaft 6 is transferred to the driven roller 61 continuously to provide rotation of the roller 71 counterclockwise as seen in FIG. 3, by the following gear-pulley-belt train; a helical gear 17 that meshes with a helical pinion 79 which, in turn meshes with another helical pinion 80, a bevel gear 83 that meshes with a bevel gear 81 which is secured on the same shaft 82 as that of the helical pinion 80, a pulley 84 driven by the bevel gear 83 which is driven through a spur gear, an idle gear, a spur gear, pulleys 85 and 86 secured on the pivot shaft 63 of the arm 62, a belt 87 connecting pulleys 84 and 85, a pulley 88 secured on a rotatable shaft 89 on which the roller 61 is mounted and a belt 90 connecting pulleys 86 and 88.

Therefore, when the roller 61 functionally engages the package 91 rotatably supported by the winding unit 2 (FIGS. 3 and 4), the package 91 is subjected to a slight rotation in the direction indicated by the arrow shown in FIG. 3 by the driving action of the roller 61.

A curved lever 92 having a shape as shown in FIG. 4 is pivoted in a horizontal plane on a pivot 93 and the lever 92 is urged to rotate clockwise (FIG. 4) by the force of a spring 94. A lever 95 for carrying yarn is disposed under the lever 92 and is pivoted by a pivot 96. A pin 97 is secured on the lever 95 in such a manner that it protrudes through an arc-shaped long aperture 98 formed in the curved lever 92, whereby, when the curved lever is subjected to clockwise rotation by the spring 94, the lever 95 turns 90 degrees in a horizontal plane.

A yarn carrying wire 99 is secured on the free end of the yarn carrying lever 95 so that it is positioned as shown by the dotted line of FIG. 4.

When a roller 100 disposed at the lower end portion of the branch arm 77 of the arm 62 is placed in a retracted position, the roller 100 presses the free end surface of the curved lever 92 so as to keep a balanced relation with the arm 62, but when the arm 62 moves away from the stop lever 70 the pressing action of the roller 100 on the curved lever 92 is eliminated and the carrying wire 99 is rotated to a position under and adjacent a side of the package 91, which has already been raised, at which point a yarn 151 placed at almost the central portion of the package 91 is carried to an end portion of the bobbin 58 of the package 91. A stopper 101 for the yarn carrying wire 99 is secured on the winding unit. A base portion of a brake plate 103 (FIG. 3) is pivoted by a pivot 104 to an end portion of an arm 102 so as to stop the rotation of the package by bringing the brake plate 103 into contact with a rotation package 91 by a spring (not shown).

A stop pin 105 (FIG. 3) acts as a stopper to restrict the range of movement of the brake plate 103.

Cam mechanism for discharging a full package from the cradle arms of the winding unit Referring to FIG. 11, a cradle opening lever 110 supported by a shaft 109, a lever 113 supported by a shaft 111 and a lever 15 supported by a shaft 114 are disposed at a side of the winding units 2. A roller 107 is mounted on a lower end of the opening lever 110 in such a way that the roller 107 contacts with a plate cam 106 disposed under the looped rail 1 and a pin 108 is disposed at an upper corner of the opening lever 110 and a pin 112 is disposed at a middle lower portion of the lever 113. The lever 115 is contacted by the pins 108 and 112. The open top end portion of the lever 113 engages with the bottom end of the cradle arm 117 so as to control the position of the cradle arm 117. Another lever corresponding to the lever 113 acts with another cradle arm 116 in the same manner as lever 113. As shown in FIGS. 7 to 10, the winding unit 2 has a pair of cradle arms 116 and 117, the cradle arm 117 being pivotable away from the unit 2 about a connecting pin 118. The bobbin 58 is pivotably mounted on and supported between pintles 119 and 119', in turn connected to intermediate points on cradle arms 117 and 116, respectively. A plate spring 120 secured on the bottom section of the cradle arm 117 presses the top section of the arm so as to move the pintle 119 disposed intermediate the ends of the cradle arm 117 away from engagement with the bare bobbin 58. The cradle arm 117 is pivoted about pin 118 by engaging a rail cam 121 disposed at the transferring position the package of the winding unit which cam rail 121 is placed on a passing route of the winding units. As shown in FIG. 10, if the rail cam 121 is disposed in such a way that the height of the tail portion of the rail cam 121 increases with the movement of the winding unit 2, the effect of the rail cam 121 on the cradle arm 117 can be lessened with the forward movement of the winding unit 2. Therefore, after the bobbin 58 has been inserted into the space between the cradle arms 116, 117, a sudden return motion of the cradle arm 117 can be prevented when the cradle arm 117 leaves the rail cam 121 thereby avoiding a jarring impact as the arm is returned to its original position. A sectional view of the rail cam 121 for operating the cradle arm 117 discloses an almost reverse L shaped construction but the end of the cradle arm 117 which opposes the advance of the winding unit 2 does not have the bottom portion of the reverse L shaped rail, thereby, when the cradle arm 117 of the winding unit 2 arrives at the above-mentioned partly locked portion 122 of the reverse L shaped rail cam, the end of the partly locked portion 122 becomes engaged with the top end portion of the cradle arm 117.

A pressure plate 123 having a half-moon shape is pivoted on a pivot shaft 124 in such a way that the pressure plate 123 is disposed in a position adjacent to the left side of the rail cam 121 as shown in FIG. 7.

The left end of the pivot shaft 124 is disposed a little closer to the package 91 than the right end of the pivot shaft 124, so as to engage the package 91 by the force exerted by a spring 125 mounted on the pivot shaft 124, (FIG. 8) when the package 91 comes to the position of the plate 123.

Mechanism for transferring a fully packaged bobbin from the winding unit to the respective doffing unit A pair of plates 127 for receiving a package symmetrically disposed on both sides of a combination yarn guide drum and package drive roller 126 of the winding unit.

Thus, when a winding unit having a fully packaged bobbin reaches the locked portion 122 of the rail cam 121, with the cradle arms 116 and 117 in an elevated position, the roller 107 disposed at the lower end of the cradle opening lever 110 contacts the plate cam 106 disposed under the looped rail 1 and the cradle opening lever 110 is rotated counterclockwise and pushes the lever 115 by the pin 108, whereby the lever 115 is disengaged from the pin 112 so as to disengage the top forked end of the levers 113 from the bottom end of the cradle arms 116, 117. As the cradle arms are turned from the position designated by the solid line to that of the dotted line by the above-mentioned motion, a fully packaged or wound bobbin supported by the cradle arms 116, 117 is moved close to the traverse drum 126 at a somewhat lower height and a top end 117' of the cradle arm 117 engages the end 122 of the cradle operating rail cam 121 (FIG. 10).

In the position for transferring packages, a small shaft 128 is supported parallel to the axis of the package 91, a boss 131 of a lever 130 is pivoted on the small shaft 128, a transferring plate 129 for transferring packages is secured to the lower end of the lever 130 and an end of a spring 132 is connected to the lever 130 as shown in FIGS. 11 and 12, whereby the package transferring plate 129 is normally kept in a retracted position away from the package 91.

A package transferring device 136 comprises a solenoid 133 disposed above the package transferring plate 129 and a plunger 134 connected with the top end of the lever 130 by a rod 135 for pivoting the package transferring plate 129 forward into contact with the package when the solenoid 133 is actuated. The package transferring plate 129 of the package transferring device 136 is divided into two portions at its middle, that is, a top portion 137' and a lower portion 137, as shown in FIGS. 12 and 13. The top portion 137' is pivoted to the lower portion 137 by a pin 138, and a spring 142 is fixed on the lower portion 137 and the top portion 137' by set screws 139, 140, and 141 so as to arrange the top portion 137' and the lower portion 137 in a straight line. A stop pin 143 is disposed on the package transferring plate 129, determining the position of the lower portion 137.

Means for cutting yarn between a supply cop and a fully packaged bobbin of the winding unit Referring to FIG. 17, a bracket 144 is positioned along the route of the winding unit 2 and in a position for cutting the winding yarn between the package and a supply cop or bobbin 150. A cutter 145 for cutting the above-mentioned yarn comprising a pair of scissors is mounted on an inside end section of the bracket 144 so as to face the winding unit. An L-shaped yarn transferring lever 146 is pivoted on a pivot pin 147 on the outside end section of the bracket 144, and the cutter 145 and the L-shaped lever 146 are connected to an actuating rod of a solenoid 148 disposed on the bracket 144. Whereby, when the solenoid 148 is energized, the cutter 145 is actuated and cuts yarn between the yarn supply cop 150 (shown in FIG. 3) supported by a peg 149 (shown in FIG. 3) and the package 91. At the same time or a short time after the above-mentioned yarn cutting operation, the lever 146 turns downwardly and transfers yarn end 151 supplied by the supply bobbin cop to a nonwound bobbin 58 supported by the pintles 119 and 119'. And, when the solenoid 148 is deactivated the cutter 145 and the yarn transferring lever 146 return to their original positions.

Referring to FIGS. 18 and 19, an air jet nozzle 153 is disposed under the bracket 144 so as to blow the yarn end transferred by the lever to the nonwound bobbin 58. The aperture of the air jet nozzle 153 faces the nonwound bobbin 58 which is supported by the cradle arms 116 and 117 in such a way that the bobbin contacts the traverse drum 126.

Means for carrying the doffed package out of the winding machine

Referring to FIGS. 2, 20 and 21, two posts 154 and 154' are secured in a vertical position to the central portion of a boss of the circular end cam 19. A package elevator 157 comprises a back plate 155 and a bottom plate 156, and a pair of bosses 158, 158' that slidably engage the posts 154, 154' respectively. The package elevator 157 is connected to a weight (not shown) arranged to exert an upward force on the elevator. The bottom plate 156 of the package elevator 157 is hinged at the bottom end of the back plate 155 and a pair of screen plates 159 are secured one on each side of the back plate 155, as shown in the drawing. The bottom end of the screen plate 159 is urged into engagement with the bottom plate 156 by the spring 160 thereby to maintain the bottom plate 156 and the upper catch plate 26 of the winding unit PL in a straight line. A bracket 161 is also secured to the circular end cam 19, and a sprocket wheel 162 is rotatably supported by the bracket 161. A bracket 163 is secured to the top end portion of the post 154 rotatably to support another sprocket wheel 164 and an endless chain 165 is mounted on sprocket wheels 162 and 164 to provide a driving connection therebetween.

An end of a lever 166 is piovtally connected to the back of the package elevator 157 by a pivot pin 167. A pin 169 projecting from the endless chain 165 slidably engages a longitudinal groove 168 formed in the lever 166, whereby, when the endless chain 165 is driven the pin 169 slides along the longitudinal groove 168 and causes the lever 166 to pivot on pin 167.

A stopper 170 having a pair of horizontally projecting edges at its top and bottom ends is disposed on the package elevator 157 so as to restrict the turning of the free end of the lever 166 within a predetermined range.

A vertical shaft 171 (FIG. 5A) is supported by the bracket 163, a pinion 173 is secured to the vertical shaft 171 at its lower end and arranged to engage a spur gear 172 (FIG. 5A) which rotates with the circular disk 16, and a bevel gear 174 is secured to the upper section of the shaft 171. A bevel gear supported by the bracket 163 meshes with the bevel gear 174, and a spur gear 176 secured on the same shaft that supports a bevel gear 175 meshes with a spur gear 177 secured on the same shaft that supports the sprocket wheel 164. When the package elevator 157 is raised above a predetermined height, the front portion of the bottom plate 156 engages a stopper 178, thereby pivoting the bottom plate 156 downwardly (FIG. 20) eventually to align the plate 156 with an inclined package transfer plate.

FIGS. 22 and 23 disclose another embodiment of the package transferring device. An upper bracket 180 is secured to the upper section of posts 154, and a lower bracket 181 supports a pair of parallel side plates 182 spaced apart a distance equal to the width of the yarn package 91. A frame 183 is mounted between the side plates 182 in such a way that the frame 183 is inclined to the right as shown in FIG. 22. Shafts 184 and 185 are rotatably mounted in the upper and lower end sections, respectively, of the frame 183. Two pairs of sprocket gears 186 and 187 are secured to the ends of the shafts 184 and 185, respectively, and a pair of endless chains 188 are mounted on and connect each pair of sprocket wheels 186-187. Package elevators 189 are pivotably supported at equal intervals on the endless chains 188, the front portions of each of the package elevators 189 being provided with a package receiver 191.

An antifriction roller 192 is disposed at the lower side portion of each of the package elevators 189 so as to slide along a pair of guide rails 193 which are secured on the front side of the frame 183. A guide plate 194 having a smooth surface is mounted on the frame 183 to cover the front of the sprocket gears 186 and 187, and a substantially T-shaped package receiver 195 (FIG. 23) is disposed on the bottom end section of the guide plate 194 between the package receivers 191. Thus, when the package receivers 191, 191 carried by the chain 188 reach the package receiver 195 a compound package receiver comprising the package receiver 195 and the pair of package receivers 191 is formed. A package transfer plate is connected to the top end of the guide plate 194.

An elevator guide 197 is positioned at the rear of the frame 183 close to the path of the package elevator 189. A pair of projections 198 are disposed at the bottom end of the frame 183 in the path of the package elevators 189, whereby when the package elevators 189 come to the position of projections 198, an arm 199 projecting backward from each elevator 189 strikes the respective projection 198.

Swing levers 200 are pivotally mounted on the brackets 181 so as to form a pair of guide rails with the guide rails 193 and a supporting member 202 supports the bottom end of the swing lever.

When the upper catch plate 26 of the doffing unit PL is positioned as shown in FIG. 22 (in the drawing, the package 91 is transferred to the package receiver 195 and the upper catch plate 26 is already folded), the doffing unit PL faces the package receiver 195 and the package 91, supported by the upper catch plate 26 and the lower catch plate 42, is transferred to the package receiver 195.

Means for supplying nonwound bobbin to the doffing unit

Referring to FIG. 24, a bobbin supply device 203 is positioned within the looped rail 1 so that the front side of a bobbin container H of the bobbin supply device 203 is aligned with the doffing unit PL.

A swing shaft 204 is supported by the lower portion of the bobbin supply device 203 and a bobbin supply lever 207 having an upwardly facing curved plate for receiving bobbins is mounted by one end on the shaft 204. A lever 211 having a plow-shaped member to stir the bobbins in the bobbin container H and another lever 214 are rotatably supported on the swing shaft 204. Rollers 209, 213, and 215 are mounted on the end of the branch arm 208 of lever 207, on the end of branch arm 212 of the lever 211, and on the central portion of the lever 214, respectively, so that the above-mentioned rollers 209, 213, and 215, face three cams 216, 217 and 218, respectively, which cams are secured on a revolving shaft 205. The roller 213 is urged into engagement with the cam 217 by a spring 219 connected to the lever 211 and the rollers 209 and 215 are urged into engagement with the cams 216 and 218, respectively, by a spring 220 connected by one end to the branch arm of the lever 208 and by the other end to the lever 214.

An exit passageway 221 for the bobbins depends from the bottom of one end of the bobbin container H. A lever 225 is pivoted on a shaft 222 beneath the bobbin container H, and a Z-shaped gate plate 223 is mounted by one leg to the top end of the lever 225 so that when the lever 225 is positioned as shown in FIG. 24, the gate plate 223 can close or block the mouth of the passageway 221.

An end of a lever 227 formed with a hood 229 at its free end to the bottom end of lever 214 by a pin 228. The hook 229 is adapted to engage a roller 226 secured to the lower end of the lever 225 for a predetermined time.

A pin 232 is secured to a branch arm 231 depending from a lever 230 pivoted on the shaft 222 so that the pin 232 is positioned under the free end portion of the hooked lever 227. Thus when the lever 230 is pivoted the free end of the hooked lever 227 is pushed upwardly by the pin 232 to disengage the roller 226 of the lever 225 from the hook 229 of the lever 227.

A short shaft 233 pivotally supports a lever 235 having a cam 234 at its upper end sections, and the lower end of the lever 230 is connected to the lower end of the lever 235 by a link 236. Thus, when the cam 234 is depressed by the set bolt 56 of the doffing unit PL, the link 236 is moved endwise by the lever 235 (as shown in FIG. 24), and the lever 230 is moved to a vertical position.

A helical pinion 237 (FIG. 24) meshes with the helical gear 17 which is integrally connected to the circular disc 16. The pinion 237 also meshes with another helical pinion 238 and a bevel gear 239 mounted on the same shaft as that which supports the helical pinion 238 meshes with a bevel gear 240. A sprocket wheel 241 is secured to the same shaft that supports the bevel gear 240 while a sprocket wheel 242 secured on the cam shaft 205 that supports the three cams 216, 217 and 218 is connected to the sprocket wheel 241 by an endless chain 243.

Another mechanism for operating the bobbin gate plate 223 is shown in FIGS. 25 and 26. The bottom end of the lever 230 is pivotally connected to one end of a link rod 246 the other end of which is pivotally connected to the top end of lever 245 fulcrumed on a bracket 244. The bottom end of the lever 245 is connected to the arm of a solenoid 247, whereby, when the solenoid is not excited, the rod 246 is pulled to the right, FIG. 25, by a spring 248. With the rod 246 pulled to the right the roller 226 is prevented from engaging hook 229 by the pin 232.

When the mechanism shown in FIGS. 25 and 26 is used, the doffing unit PL doffs a fully packaged bobbin and transfers an unwound or empty bobbin to the winding unit 2. Thus, when the doffing unit PL arrives at the front portion of the bobbin supply device 203 the solenoid 247 is excited by the actuation of a switch (not shown) and the gate plate 223 is pivoted to the right (FIGS. 25, 26) thereby depositing a bobbin on the support plate 249 and 250.

Electrical means for controlling the doffing motion

As shown in FIG. 3, the peg 149 of the winding unit 2 is pivoted from the vertical position to a forward inclined position when the yarn supply bobbin is fully wound and the package reaches its full size. The peg 149 is pivoted forward as described above by a device 251 which is actuated when the yarn of a predetermined number of full bobbins are wound on the yarn supply bobbin 150. As peg 149 pivots forwardly a roller mounted on the bottom end of the peg 149 actuates four microswitches 253, 254, 255 and 256 in succession as the winding unit 2 travels along the looped rail 1.

The first microswitch 253 is disposed along the looped rail 1 and placed directly under a device for winding yarn around a fully packaged bobbin just before cutting the yarn. The microswitch 253 is connected with the solenoid 73 of the above-mentioned device. The second microswitch 254 is placed ahead of the microswitch 253 in the direction of travel of the winding unit 2 and is connected to the solenoid 40 which operates the straight rod cam 28 of the circular end cam 19 (FIGS. 2 and 5). The third microswitch 255 is disposed along the looped rail 1 and is placed just under the path of the package transferring plate 129 and is connected to the solenoid 133 for actuating the package transferring device. The fourth microswitch 256 is disposed along the looped rail 1 and is placed just under the path of the yarn cutting lever 146 (FIG. 17) and so connected with the solenoid 148 which actuates the yarn cutter for cutting the yarn 151 fed from the supply cop 150.

Means for preventing the jamming of the bobbins in the bobbin container H

The mechanism shown in FIGS. 27, 28 and 29 function to prevent formation of a blocking bridge of bobbins as shown in FIG. 30. The mechanism comprises a cam 257 secured on the rotatable shaft 205, a swing lever 211 having a branch lever 208 supported by the swing shaft 204 in such a way that the roller 213 mounted on the free end of the branch lever 208 is urged into contact with the cam 257 by the spring 220, and an angled member 259 that extends upwardly from the free end of the swing lever 211. The cam 257 comprises a pair of projecting portions arranged on the boss of the cam 257 at 180° intervals. The cam is driven at a high speed so as to provide the swing lever 211 with a motion that is further than the speed of the doffing unit PL and the swing lever is pivoted through an arc that is larger than the diameter of the bobbin.

The exit passageway 221 of the bobbin container H is provided with an elongated slot 258 formed in the bottom surface of the container H parallel to the axis of the bobbins 58. A vertical segment of the member 259 is adapted to move vertically through the slot 258 by the swinging motion of the swing lever 211. A swing plate 260 is articulated to the free end 261 of the vertical segment of the member 259 and is almost twice the length of the bobbin diameter. The free end of the plate 260 is placed on the bottom plate 203 of the container H in such a way that some of the bobbins in the container H normally rest on the swing plate 260. A projecting supplementary wall 262 (FIG. 29) is disposed on a side wall 263 of the container H in such a way that the wall 262 has a surface that faces the swing plate 260 so as to limit the pressure exerted by the bobbins stacked back in the container H against the bobbins positioned adjacent the exit passageway 221.

In the embodiment shown in FIG. 28, a star cam having three projecting portions is used as a substitute for the cam 257 shown in FIG. 27 and the three projecting portions are arranged around the circumference of the cam at equal intervals of 120°. The three projections of the cam provide one more reciprocation of the swing plate 260 during each rotation of the cam than in the embodiment shown in FIGS. 27 and 29. This provides for more than one and half swings for every pass of the doffing unit PL by the bobbin supply device 203.

The step of winding the yarn end diagonally around a fully packaged bobbin

Referring to FIGS. 1, 2, 3, 4 and 5, when the package 91 of the winding unit 2 reaches a predetermined size, the peg 149 pivots forwardly in a manner well known to those versed in the art and the roller 252 disposed on the lower end of the peg 149 moves downwardly to the position designated by the solid line in FIG. 3. When the winding unit 2 reaches the front of the doffing device the roller 252 triggers the microswitch 253 to close the electric circuit of the solenoid 73 (FIG. 4), thereby pulling the plunger 74 into the solenoid, the stop lever 70 connected to the solenoid 73 pivots in a horizontal plane, the small arm 77 of the arm 62 is disengaged from the stop lever 70, and the arm 62 is turned forwardly (counterclockwise in FIG. 3) by the bias of the spring 64, whereby the arm 62 is pivoted to move into positional engagement with the lower side of the package 91. As the arm 62 pivots counterclockwise the curved lever 92, whose movement is normally restricted by the roller 100, is disengaged from the roller 100 and the curved lever 92 is turned in the clockwise direction (FIG. 4) by the bias of the spring 94 and the yarn carrying lever 95 is turned in the same direction as that of the curved lever and the yarn carrying wire 99 is turned 90° in a horizontal plane under the package 91 so as to move its top end to the left side of the package 91 (FIG. 4). The rotation of the driving shaft 8 is transmitted to the helical gear 17 through the spur gear 10 rotating as a unit with the sprocket wheel 5, the pinion 14 and the helical pinion 15. The rotation of the helical gear 17 is transmitted to the roller 61 through the helical pinions 79, 80, the bevel gears 81, 83 (FIG. 4), a spur gear, an idled gear (not shown) and the pulleys 84, 85, 86 and 88 so as normally to rotate the roller 61 in the direction shown by the arrow (FIG. 3). Meanwhile the sprocket wheel 5 for driving the winding units is normally driven by the driving shaft 8 by way of the pinion 9 and the internal gear 7. When the package 91 is removed from the traverse drum 126, and the yarn transferring wire 99 pivots to the left side of the package 91 so as to move the strand of yarn 151 connected to the supply cop 150 to the left side of the package 91, the roller 61 is brought into engagement with the package 91 and the package 91 is rotated so as to wind a predetermined length of yarn around the side of the package. The above-mentioned side winding operation terminates when the microswitch 254 is triggered by the cam 78 that is, the fork lever 66 is pivoted to the position shown by the dotted line in FIG. 3 by the action of the cam 78 and the arm also moves to the position shown by the dotted line in FIG. 3 and the roller 61 is removed from contact with the package 91.

When the solenoid 73 is disengaged the hooked lever 70 returns to its normal position by the action of spring 76 and engages the small arm 77 of the arm 62 and the curved lever 92 returns to its normal position, whereby the yarn transferring wire 99 returns to the position shown by the dotted line in FIG. 4.

By the above-mentioned side-winding operation, the yarn between the supply cop and the yarn package is kept in a predetermined path, the cutting operation of the above-mentioned yarn can be done easily and moreover, the tail end of the package yarn can be found easily because the tail end of the package yarn is normally wound along the side of the fully packaged bobbin.

Discharge motion of a fully packaged bobbin from the supporting cradle arms

Referring to FIGS. 1, 2, 5, 7, 8, 9, 10 and 11, after completion of the above-mentioned side-winding, the winding unit 2 actuates the microswitch 254 so as to energize the solenoid 40 and pull the connecting rod 41 upwardly (FIG. 2) thereby pivoting the lever 39. In addition the straight rod cam 28 secured on the same pin 33 of the lever 39 also pivots upwardly as shown by the dotted line in FIG. 2, thereby allowing the roller 22, of the doffing unit which operates the above-mentioned side-winding, to ride along the undulating sections of the cam surface represented by the letters A, B, C, D, E and F.

As the roller 22 advances along the circular end cam 19 from point O to point A the lever 21 including the segment gear 20 turns counterclockwise (upwardly in FIG. 2) due to the tension exerted by the spring 23, thereby rotating the pinion 25 in a clockwise direction (FIGS. 2 and 5A). The upper catch plate 26 mounted on the shaft 24 for the pinion 25 turns clockwise, thereby gradually lowering the front end of the upper catch plate 26. When the top end of the stop lever 50 disposed under the upper catch plate 26 strikes the cam 54, vertically disposed on the bracket 11, stop lever 50 and the pin 46 become disengaged.

Since the pin 46 supports the links 48, 48 disposed on both sides of the lower catch plate 42, when pin 46 is disengaged from the stop lever 50 the lower catch plate 42 lowers by virtue of its own weight. Thus, the lower catch plate 42 which was folded on the upper catch plate 26 at the first stage is pivoted open from its folded position and the opened lower catch plate 42 pivots till the set bolt 56 disposed on the under surface of the lower catch plate 42 strikes the stop piece 55.

In the next stage in the operation of the mechanism the roller 22 reaches the point B of the circular end cam 19 and the lower catch plate 42 is raised a small amount along in a clockwise direction (FIGS. 2 and 5A). The upper catch plate 26 mounted on the shaft 24 for the pinion 25 turns clockwise, thereby gradually lowering the front end of the upper catch plate 26. When the top end of the stop lever 50 disposed under the upper catch plate 26 strikes the cam 54, vertically disposed on the bracket 11, stop lever 50 and the pin 46 become disengaged.

Since the pin 46 supports the links 48, 48 disposed on both sides of the lower catch plate 42, when pin 46 is disengaged from the stop lever 50 the lower catch plate 42 lowers by virtue of its own weight. Thus, the lower catch plate 42 which was folded on the upper catch plate 26 at the first stage is pivoted open from its folded position and the opened lower catch plate 42 pivots clockwise (FIG. 5B) till the set bolt 56 disposed on the undersurface of the lower catch plate 42 strikes the stop piece 55.

In the next stage in the operation of the mechanism the roller 22 reaches the point B of the circular end cam 19 and the lower catch plate 42 is raised a small amount along with the upper catch plate 26 while the plate 42 remains in its opened posture. At this point the winding unit 2 has moved close to the plate cam 106 and the rail cam 121 for operating the cradle arm so that the plate cam 106, disposed under the looped rail 1, contacts the roller 107 disposed at the end of the cradle opening lever 110. When this occurs the cradle releasing lever 110 turns counterclockwise, the pin 108 of the lever 110 pushes the lever 115 so as to release lever 115 from engagement with the pin 112 and releases the top end of the lever 113 from engagement with the bottom end of the cradle arms 117 and 116.

When the lever 113 is released from engagement with arms 116 and 117 the cradle arms 116 and 117 turn clockwise a short distance as shown by the dotted line in FIG. 11 so as to carry the package 91, supported by the cradle arms 116 and 117, closer to the traverse drum 126 and the top end 117' of the cradle arm 117 is moved to the position for engaging the rail cam 121.

As shown in FIG. 7, when the top end 117' of the cradle arm 117 engages the locked portion 122 of the rail cam 121, the cradle arm 117 turns clockwise by the action of the cam 121 due to the forward movement (movement in the left hand direction in FIG. 7) of the winding unit 2, whereby the distance between the bearing centers 119 and 119' is partially increased. Then, the forward side of the package 91 moves into contact with the package pressure plate 123.

As described above, the package pressure plate 123 is mounted on the pivot shaft 124 in such a way that the left side of the pivot shaft 124 is disposed closer to the package 91 than its right side, and the bottom portion of the package pressure plate 123 is pushed by the spring 125 into contact with the package 91. Therefore, by virtue of the forward movement of the winding unit 2, the package 91 is pushed in the reverse direction to the forward motion of the winding unit 2 (right hand direction in the drawing), both ends of the bobbin of the full package 91 leave the respective bearing center 119′ and 119 while the top end of the cradle arm 117 engages with the rail cam 121 and the full package 91 is dropped on the package receivers 127 disposed on the traverse drum 126, and is supported by the traverse drum 126 and the package receivers 127.

Package transferring operation

Referring to FIGS. 6, 8, 11 and 12, the package 91 supported by the traverse drum 126 and the package receivers 127 is then transferred to the package catch plate of the winding unit by the package transferring device 136.

The cradle arm 117 after transferring the package 91 continues to be acted on by the rail cam 121, and the distance between the bearing centers 119 and 119′ is kept relatively until both the package delivering operation and bobbin supply operation for the winding unit are completed.

When the winding unit 2, which delivered the package 91 to the traverse drum 126, actuates the third microswitch 255 and the solenoid 133 is excited, the plunger 134 of the solenoid 133 operates to the lever 130 clockwise (FIG. 6). The transferring plate 129 secured to the bottom end of the lever 130 is thereupon pivoted into contact with the package 91 (the right side thereof in FIGS. 8 and 12) and the package 91 is pushed onto the lower catch plate 42 of the doffing unit PL while the lower catch plate 42 is in the opened condition as seen in FIG. 6.

The above-described operation is carried out while the winding units are advancing. In the embodiment shown in FIGS. 12 and 13 the package transferring plate 129 is divided into a lower portion 137 and a top portion 137′ in such a way that the lower portion 137 can be pivoted about the set screw 138 secured to the top portion while opposing the spring 142. After the cradle arms 116 and 117 have passed, the lower portion 137 can be returned to the normal position by the spring 142, if the cradle arms 116, 117 strike the package transferring plate 129 by mistake.

As described above, by using the inclined rail shaped cam mechanism, the package may be discharged from the supporting cradles each and every time that the mechanism is actuated. Furthermore after transferring the package from the cradle arms, the cradle arms are kept in their opened position so that the bobbin supplying operation for the winding unit may be carried out very easily.

While the package taken from the supporting cradles is being moved onto the traverse drum and the package receivers, the longitudinal axis of the package remains parallel with the axis of the traverse drum. Therefore, the package may be transferred to the doffing unit accurately and a precise transferring operation for the doffed package can be obtained without dropping the doffed package onto the floor.

Moreover, by using the above described method for moving the package onto the traverse drum, the time necessary to operate the delivering device is shortened, therefore the present transferring method can be opearted more steadily than other methods such as, transferring the package to a doffing unit while discharging the package from the supporting cradles.

The operation of the package delivery plate 129, which pushes the package in such a way that the plate provides the package with a uniform force along the length of the package is one of the features of the package transferring motion of the doffing unit according to the present invention, and a precise package transferring operation, is thereby obtained.

Bobbin supply operation and transferring operation of the yarn end

Referring to FIGS. 2, 5, 17, 18 and 19, after the package 91 has been transferred to the doffing unit PL and the roll 22 has reached the point C of the circular end cam 19 (FIG. 2), the lower catch plate 42 is transferred along a substantially hoizontal plane because the cam surface adjacent to point C is almost flat as nonwound or empty bobbin 58 supported by the lower catch plate 42 is transferred to the center line between the bearing centers 119, 119′ of the cradle arms 116, 117 and when the top end of the cradle arm 117 disengages from the rail cam 121 as the winding unit 2 advances, the distance between the bearing centers of the cradle arm 117 and 116 gradually shrinks to the point where the transferred bobbin 58 is supported by the bearing centers 119, 119′.

After the above-described motion, the roll 22 moves upwardly until it reaches point D of the circular end cam 119, whereby, when the upper catch plate 26 returns to the horizontal position (the dotted line in FIG. 5), the winding unit 2 actuates the fourth microswitch 256, so as to energize the solenoid 148, (FIGS. 17, 18). The energized solenoid 148 actuates the yarn cutter 145 through a link motion (not shown) and the yarn supplied from the supply bobbin 150 to the package 91 is cut by the cutter 145. Simultaneously, the yarn transferring lever 146 is turned by the solenoid 148 to move the tail end of the yarn hanging on the yarn transferring lever 146 from the back side to the front side of the bobbin 58. Then the cradle arms 116 and 117 are turned downwardly and the bobbin 58 is brought into contact with the traverse drum 126, and the nozzle 153 directs a stream of air over the bobbin 58, whereby, the tail end of the yarn is positively led into contact with the front side of the bobbin 58.

As mentioned above, the bobbin holder is disposed beneath the catch plate of the doffing unit and when the transferring operation of the package is completed, the bobbin supported by the bobbin holder can be supplied to the winding unit automatically. When the traverse drum starts to rotate, the tail end of the yarn is wound around the nonwound bobbin 58, thereby effecting the first step of the winding operation without the necessity of a manual operation.

Also, if the tail end of the yarn escapes the yarn transferring wire, the tail end of the yarn is led to the bobbin by the action of the jet of air from the air jet nozzle. Thus even where the yarn has strong twist or high crimped construction, the winding the tail end around the bobbin can be effected each time.

The package transfer operation

Referring to FIGS. 1, 2, 5A, 5B, 20, 21, 22 and 23, as the free end of the straight rod cam 29 rides on the pin 37 secured to the inner wall of the circular end cam 19, the doffing unit PL is lifted to its highest position as the roller 22 reaches point E. In addition, the front end of the upper catch plate 26 is turned upwardly gradually (referring to the upper catch plate 26 shown by a solid line in FIG. 5A) and the package 91 on the upper catch plate 26 is transferred to the package elevator 157 (FIGS. 20, 21). Then the lower catch plate 42 is folded on the upper catch plate 26 by the bias exerted by the spring 44 and the pins 46, 47, which connect the link 48 with the upper catch plate 26 and the lower catch plate 42 respectively, and the motion of the lower catch plate 42 is stopped by its engagement with the stop lever 50.

Referring to FIGS. 5A, 5B, 20, 21, 22, the package 91 transferred from the doffing unit to the package elevator 157 is lifted in an upward direction by the elevator 157. When the free end of the bottom plate 156 reaches the stopper 178, the forward and upward motions of the bottom plate 156 are halted while the elevator 157 continues to rise thereby pivoting the bottom plate 156 downwardly as shown by the dotted line in FIG. 5A. At this point the package 91 rolls along the bottom plate 156 towards the conduit 179 as indicated by the arrow in FIG. 5A. The package on the conduit 179 is thereupon transferred by any suitable means such as a conveyor belt.

When the embodiment for transferring packages shown in FIGS. 22 and 23 is used and the upper catch plate 26 reaches the position wherein it is aligned with the package receiver 195, the package 91, temporarily supported on the doffing unit PL, is transferred to the package receiver 195 and is carried away from the winding machine by means hereinafter described.

As it is preferable to stop the endless chain 188 when the package is being transferred from the doffing unit PL to the package receiver 195, the endless chains 188 are driven intermittently, and the pair of elevators 189 which is moved in the direction shown by the arrow in FIG. 22 and carried by the chains 188 is also driven intermittently. Thereby the package 91 is transferred to the package receiver 195, and when the package receivers 191 come abreast of the package receiver 195 as the elevators 189 are raised the package supported by the package receiver 195 is carried upwardly by the package receivers 191 in such a way that, while carrying the package, both ends of the package are supported by the package receivers 191 of the elevators 189.

As the package 191 is elevated the antifriction rollers 192 mounted on the side of the elevators 189 roll on the guide rail 193. In addition, the rollers 192 act as fulcrums for the package receiver 191 to provide a good support for the package 91.

As the package 91 is elevated, the elevators 189 turn, when they arrive at the top end of the elevator frame (FIG. 22), and the package 91 slides down onto the transferring conduit 196. At the same time the package receiver 191 is turned clockwise (FIG. 22) so as to be folded by the action of the top end of the elevator guide 197. The package receiver 191 continues its downward motion in the folded condition. At its lowered position, just before the package receiver 191 turns to move upwardly again, the projecting arm 199 of the elevator 189 strikes the projection 198 disposed on the frame, thereby the elevators 189 are turned counterclockwise (FIG. 22). The rollers 192, 192 on the elevators 189, 189 are pushed to the front of the swing lever 200, after passing the antifriction rollers 192 when the swing lever 200 begins to be supported by the supporting member 202. The lever 200 is converted into a series of guide rails with the guide rail 193, and the antifriction rollers 192 of the elevator 189 ride on the guide rails. Then, the package receivers 191 once again are arranged to support the package 91.

As mentioned above, the transfer of the packages to the doffing unit is carried out by the winding machine without dropping any of the packages. As a plurality of package elevators are provided, the operation of transferring the packages can be carried out very efficiently, and in addition installation of space can be saved by using elevators which can be folded when moving along the back side of the device.

Bobbin supply operation

Referring to FIGS. 1, 5A, 5B, 24, 25, 26, 27, 28, 29 and 30, when the roller 22 reaches the point F on the circular end cam 19, the set bolt 56 projecting from the lower catch plate 42 pushes the cam 234, pivoted by the small shaft 233 (FIG. 24). The link 236 moves to the left (FIG. 24) and the pin 232 disposed on the branch arm 231, which is pivoted by the shaft 222, is moved downwardly from the position shown by the dotted line to the position shown by the solid line. Therefore, the free end of the hooked lever 227, riding on the pin 232 moves downwardly, and the roller 226 of the lever 225, which is supported by the shaft 222, is brought into engagement with the hook 229 formed at the free end of the swing lever 227. The three cams 216, 217 and 218 secured on the shaft 205 are driven by a gear train including the helical gear 17, the cam 217, the helical pinions 238, the bevel gears 239, 240 and the chain drive mechanisms 241, 242, and 243. While the hook 229 of the hooked lever 227 engages the roller 226 of the lever 225, the lever 225 turns in the same direction as that of the lever 214, when the lever 214 turns clockwise by the action of the cam 218, whereby the bobbin 58 supported on the bobbin reserve plate 223, which is supported on the upper portion of the lever 225, is supplied to the bobbin receiver 206 disposed at the top end of the bobbin supply lever 207. Then the cam 216 actuates the branch arm 208 of the bobbin supply lever 207, and the bobbin supply lever 207 is turned counterclockwise shown in FIG. 24. As described above, the lever 207 to which a bobbin 58 has been supplied is actuated, and the bobbin 58 supported on the bobbin receiver 206 is inserted into the bobbin holder 57 which in turn is disposed under the lower surface of the lower catch plate 42 (as shown in the left side of FIG. 24).

During the above-mentioned motion, the cam 218 moves out of contact with the lever 214 and the lever 214 returns to its original position by the bias of the spring 220, and the hooked lever 227 slides to the right (FIG. 24). Consequently, the lever 225 which has been freed from engagement with the hook 229 of the lever 227, loses its balance and turns counterclockwise, then the Z-shaped gate plate 223 disposed on the top end of the lever 225 is once again brought directly under the exit passageway 221 so as to receive a new bobbin 58'.

When the bobbin 58 is supplied to the doffing unit PL and the new bobbin 58' is supplied to the gate plate 223, the bobbin supply lever 207 returns to its normal position (the dotted line in FIG. 24) due to the bias exerted by the spring 220 and its branch arm is released from engagement with the cam 216 so as to be in a position for supplying bobbins. The lever 211 pivots in response to the revolution of cam 217, and the bobbin plow 210 disposed at the top end of the lever 211 is provided with a lifting motion, whereby the bobbins 58 in the bare bobbin container H are stirred by the plow 210, and moved to the passageway 221 gradually. In the meantime the doffing unit PL is being raised gradually as the roller 22 rolls on the circular end cam 19 and passes point F (FIG. 1), the upper catch plate 26 and the lower catch plate 42 are lifted upwardly, and when the roller 22 reaches point G which is at the same height as that of the point O, the upper catch plate 26 and the lower catch plate 42 are returned to the position shown by the solid line (FIG. 5B) that is, they are returned to the doffing position.

In another embodiment of the bobbin supply device, when the doffing unit PL after the completion of the doffing operation, reaches the front of the bobbin supply box H, the solenoid 247 is excited by the closure of a switch (not shown) and the lever 230 is turned clockwise (FIG. 25) by the lever 245 and the rod 246. The pin 232 supporting the free end of the hooked lever 227 is displaced downwardly, and when the lever 245 slides in a horizontal plane to the left, the hook 229 engages the roller 226 of the lever 225 so as to turn the lever 225 clockwise. Consequently, the bobbin gate plate 223 disposed on the top end of the lever 225 is moved in the same direction as the lever 225 and the bobbin 58 supported on the gate plate 223 is transferred to the bobbin receiver 206. Meanwhile an upper catch plate 224 of the bobbin gate plate 223 reaches a position directly beneath the bobbin exit passageway 221, and prevents the free fall of the bobbin from the passageway.

The bobbin receiver 206 is lifted upwardly to the vicinity of the bobbin holder 57 by the motion of the levers 207, 214, and supplies bobbins 58 to the winding unit. Meanwhile, the hooked lever 227 returns to its original position and releases the roller 226, then the lever 225 turns counterclockwise by virtue of its own weight, and the bobbin gate plate 223 returns to the position shown in FIG. 25, consequently, the closed bobbin exit passageway 221 is opened once again, and a bobbin 58 is supplied to the bobbin gate plate 223.

In the embodiment for a bobbin supply device shown in FIG. 27, the lever 211 swings periodically during each revolution of the cam 257, consequently the bobbins 58 placed on the swing plate 260 are provided with vertical motion as a result of the motion of the swing plate 260 which is articulated to the vertical end portion of the member 259 secured on the lever 211, and the bobbin 58 is positively fed to the bobbin passageway 221, by which the formation of a bridge of bobbins at a point adjacent to the bobbin passageway can be prevented.

As shown in FIG. 29, when the swing plate 260 is positioned on the bottom surface of the bobbin container H, and a bridge of bobbins shown by the dotted lines is formed, it is sometimes difficult to break such a bridge of bobbins by the vertical traverse motion of the member 259.

However the supplementary wall 262 prevents the development of an excess pressure from the weight of the other bobbins in the container H which would press against the bobbins positioned in a portion adjacent to the exit passageway 221. Consequently, if some of the bobbins accumulate at a place adjacent to the exit passageway 221 and form a bridge, the supplementary wall 262 disturbs the free upward movement of the accumulated bobbins by the upward movement of the swing plate 260 and the bridge of bare-bobbins is easily broken.

Other methods which can be considered for breaking the bridge are as follows;

It is also helpful for the prevention of the formation of a bridge of bobbins if the side wall 263 is provided with a curved portion in lieu of the flat supplementary wall 262.

If a horizontal aperture is provided in the side wall 263 and a stop plate passing through the horizontal aperture goes in and out periodically in such a way that, when the bridge of the bobbins is lifted upwardly by the upward motion of the member 259, the forward end of the stop plate enters the container, the bridge of bobbins is broken.

As mentioned above, the bobbin supply operation is very efficiently performed by the present invention, consequently, the efficiency of the doffing unit is greatly improved, moreover, by preventing the formation of a bridge of bobbins at the place adjacent to the bobbin exit passageway of the container, the bobbin supply motion can be operated smoothly without any difficulty.

The doffing device according to the present invention comprises a plurality of doffing units having an upper catch plate which includes a bobbin holder and a lower catch plate which is pivotally connected to the upper catch plate for folding relatively to the upper catch plate, a mechanism for driving the doffing units in synchronism with the respective winding units, a cam mechanism for providing the catch plates of the winding units with a lifting motion at a predetermined position to open and close the catch plate of each doffing unit, a mechanism for winding a yarn end diagonally across a bobbin package while the package is supported by a pair of cradle arms, a cam mechanism having a rail shape and which includes an angled portion adapted to cause the removal of a packaged bobbin supported by a pair of cradle arms, a mechanism for moving the packaged bobbin from the cradle arms to a respective doffing unit, means for placing automatically a bobbin held by a bobbin holder of the respective doffing unit on a pair of cradle arms, a mechanism for cutting yarn between a cop vertically supported by a peg of the winding unit and a package shifted to the doffing unit and for leading the cut end of the yarn around the bobbin supplied to the respective winding unit, a mechanism having a lift for carrying the packaged bobbin shifted onto the respective doffing unit from the winding unit, and a mechanism for supplying a bobbin to the respective doffing unit. Thus, the doffing unit PL according to the present invention can perform the operations required to doff fully packaged bobbins from winding units.

Such operations include sensing fully packaged bobbins, driving the doffing units in synchronism with the doffing unit, winding an end portion of the yarn diagonally around a full cone or cheese of the respective winding unit, removing the full cone or cheese from the respective winding unit, leading an end of feed yarn from the respective supply cop which is supported at the lower portion of the respective winding unit, and carrying the doffed cone or cheese out of the winding machine by means of a conveyer and supplying bobbins to the respective doffing unit automatically and smoothly.

While the invention has been described in conjunction with certain embodiments thereof is to be understood that various modifications and changes may be made without departing from the spirit and scope of the invention.

What is claimed is:

1. A doffing apparatus of an automatic winding machine having a frame and a plurality of winding units each carrying a package and carried along a closed transport path by a conveying means; comprising, a plurality of doffing units each having a package receiver; means for carrying said plurality of doffing units along a path adjacent to said closed transport path synchronously with said winding units; means for transferring said packages from said winding units to said doffing units facing said winding units, respectively, while said doffing units and said winding units are carried synchronously along their own path; means for discharging said transferred packages from said doffing units; means for detecting the size of said package on said winding units; means for actuating said transferring means by an action of said detecting means when said detecting means detects a predetermined size of said package of said winding units; means for supplying a bare bobbin to each of said doffing unit after discharging said package from said doffing unit.

2. A doffing apparatus of an automatic winding machine according to claim 1, further comprising means for supplying a supply cop, supply means for supplying a bare bobbin from said doffing unit to said winding unit during the operation of said transferring means, means for wrapping yarn from a supply cop around said bare bobbin supplied to said winding unit.

3. A doffing apparatus of an automatic winding machine according to claim 2, further comprising means for wrapping yarn around an end portion of said bobbin of said package, and means for cutting yarn located between said package and said supply cop, supported by said winding unit, before transferring said package from said winding unit to said package receiver of the corresponding doffing unit.

4. A doffing apparatus of an automatic winding machine according to claim 11, further comprising a power transmission means and wherein said means for carrying doffing units comprises a vertical shaft rigidly mounted on said frame of said winding machine at an inside position of said closed transport path of said winding units, a horizontal disc rotatably mounted on said vertical shaft, a sprocket wheel having an inner gear rotatably mounted on said vertical shaft, a driving wheel driven continuously from said power-transmission means and meshed with said inner gear for driving said sprocket wheel, a train of gearing transmitting the driving of said sprocket wheel to said horizontal disc in synchronous condition to said conveying means; a plurality of brackets disposed on the circumferential portion of said disc with equal intervened distance, each of said brackets supporting said doffing unit and each doffing unit facing each winding unit carried by said conveying means.

5. A doffing apparatus of an automatic winding machine according to claim 1, further comprising a vertical shaft rigidly mounted on said frame of said winding machine wherein said means for actuating said transferring means comprising a circular cam mechanism for controlling the motion of said package receiver of said doffing units, said circular cam mechanism having a circular end cam having a plurality of curved portions and flat portions for guiding, and a plurality of straight cams disposed relatively to said circular end cam in the same attitude as that of said flat portions of said circular end cam, an electrical means for actuating one of said straight cams as a gate cam by an electrical signal of said detector when said package of said winding units becomes a full package, said circular end cam mechanism coaxially secured on said vertical shaft with said disc, a plurality of rollers rotatably mounted on each of said package receivers, respectively, said circular cam mechanism forming a guide for guiding said rollers thereby said gate cam is opened by said electrical means when said detector detects the size of said package of said winding units as a predetermined size then said rolls of package receivers are led into said cam surface of said circular end cam and provided with the action for controlling the motion of said package receivers, while said gate cam is kept in a closed condition said rolls roll along the horizontal flat surface of said straight cams and said flat portions of said circular end cam for keeping said package receiver out of a doffing condition.

6. A doffing apparatus of an automatic winding machine according to claim 5, wherein said package receiving device comprises an upper catch plate for receiving transferred packages from the corresponding winding unit, and a lower catch plate articulated its end to an end of said upper catch plate, said upper catch plate controlled by said roller on the controlled surface of said circular cam, said upper catch plate provided with a barebobbin holder.

7. A doffing apparatus of an automatic winding machine according to claim 3, further comprising a package drive roller and a bracket mounted on said winding unit, a main shaft rotatably mounted on said winding machine, wherein said means for wrapping yarn closely around an end of the end bobbin of said package comprises means for releasing the contact of said package with said package drive roller of said winding unit, a roller rotatably mounted on said bracket of said winding unit a gear train disposed to said bracket, said gear train transmit the rotation of a main shaft of said winding machine to said roller when the contact of said package with said package drive roll is released, yarn shifting means for carrying yarn end to an end portion of bobbin of said package while said package is rotated by said roller.

8. A doffing apparatus of an automatic winding machine according to claim 7, wherein said cutting means comprises a pair of scissors mounted on said bracket of said winding unit at a position closely adjacent to the path of said yarn between said package and said supply cop of said winding units, a solenoid connected to said scissors for actuating said scissors to cut yarn between said package and said supply cop when said yarn shifting means shifts yarn to said end portion of said bobbin of said package.

9. A doffing apparatus of an automatic winding machine according to claim 2, further comprising a plurality of package drive rollers and a plurality of cradle arms rotatably mounted on said winding units, respectively, and wherein said means for transferring said package having a predetermined size comprises means for changing the attitude of said cradle arms of each winding unit when the package of said winding unit becomes a predetermined full size; a rail shaped cam disposed in the path of the top end of said cradle arms of said winding units; said rail shaped cam provided with a portion engageable with said top end of one cradle arm when the attitude of said cradle arm is changed; a package transferring plate disposed at a position closely adjacent to the forward path of said winding units, an electrical means disposed on said frame of said winding machine for actuating the forward motion of said package transferring plate, thereby when the package of the winding units becomes full size, the attitude of cradle arms of said winding units are changed by the action of said changing means, and then the end of one cradle arm of each of said winding units engages with said engageable portion of said rail cam, while said package receivers of said respective doffing units art transferred to the position for receiving the packages, and then the top end of each of said cradle arms of the winding units engage with the end of said rail cam, consequently the distance between said pair of cradle arms of said winding units is sufficiently enlarged to drop said packages upon said package driving roller of said winding units, and said packages positioned upon said package driving rollers are pushed to said package receiver of said facing doffing units by the forward motion of said package transferring plate which is actuated by said electrical means when said winding units arrived at the actuating position of said electrical means, said packages having full size are transferred from said winding units to said package receiver of said facing doffing units.

10. A doffing apparatus of an automatic winding machine according to claim 9, further comprising upper and lower opposing catch plates disposed on said package receiver, and wherein said means for supplying bare bobbin from said package receiver of said doffing units to said winding units comprises means for carrying said upper catch plate of said package receiving device to a rotatably bare bobbin supporting position of said cradle arms of said winding units while holding said bare bobbin in said bare bobbin holder of said upper catch plate, a rail cam mechanism for opening the intermediate distance of said pair of cradle arms of winding units while discharging the package having a predetermined size and for closing said opened distance of said pair of arms when said bare bobbin holder arrives at said bare bobbin supporting position of said cradle arms while doffing units are facing said winding units.

11. A doffing apparatus of an automatic winding machine according to claim 9, further comprising upper and lower opposing catch plates and a bare bobbin holder disposed on said package receiver, and wherein said means for supplying bare bobbin to said doffing units comprises a bare bobbin container having an outlet disposed beside said winding machine, a first cam mechanism disposed under said container, a second cam mechanism coupled to said upper catch plate, a swing lever driven by said first cam mechanism having a free end, a bare bobbin reserve plate disposed under an outlet of said bare bobbin container, a link motion mechanism controlled by said second cam mechanism related to said upper catch plate of said package receiver thereby when said doffing units doff a package of full size from said winding units at the lowest position of its for receiving a discharged package from said winding units, said free end of said swing lever is swung upwardly and transfers said supporting bare bobbin into said bare bobbin holder of said package receiver by the action of said second cam mechanism, and after completion of said bare bobbin transferring motion from said swing lever to said bare bobbin holder, said package receiver is subjected to an upward lift by the action of said circular end cam, while said bare bobbin reserve plate receives a fresh bare bobbin from said bobbin container and transfers a bare bobbin on to said free end of said swing lever by the action of said link motion mechanism.

12. A doffing apparatus of an automatic winding machinery according to claim 11, wherein said bare bobbin container has an aperture disposed adjacent said outlet and is provided with a member for preventing occurrence of a bridge of bobbins at a portion adjacent said outlet, said member comprising a lever synchronously swing with said swing lever and a first plate disposed at an end of said lever, a traverse mechanism of said first plate passing through said aperture, and a curved plate articulated at its end to the top portion of said first plate, a free end of said curved plate contacting with the bottom of said container.

13. A doffing apparatus of an automatic winding machinery according to claim 4, further comprising a plurality of bare bobbins and supply cops each disposed on said winding units, respectively, and wherein said means for wrapping yarn around said bare bobbin supplied to said winding units, comprising cutting means for cutting yarn between said full package and said supply cop of said winding unit, a yarn end transferring lever for carrying a yarn end after cutting by said cutting means forward to said bare bobbin, an electrical means for actuating said cutting means and yarn end transferring lever, an air jet nozzle for blowing air stream toward said bare bobbin, the above three elements disposed at a position adjacent to a path of said bare bobbin defined by said winding units, thereby when said package of full size arrives at the working position of doffing, said cutting means and yarn end transferring lever are actuated by said electrical means, said yarn end connected to said supply cop is carried over said bare bobbin by the transferring motion of said lever with an aid of said air stream of air jet nozzle while said bare bobbin is rotated by a package driven roll of said winding units, consequently said yarn end is wound around said bare bobbin.

14. A doffing apparatus of an automatic winding machine according to claim 2, further comprising means for carrying out said doffed package from said doffing units to out of said automatic winding machine.

15. A doffing apparatus of an automatic winding machine according to claim 24, wherein said means for carrying out said doffed package from said doffing units comprises a set of elevators disposed the bottom end of said winding machine to a related position of said doffing device for carrying said doffed package to out of said winding machinery guide means for guiding the motion of said elevators, driving means for said set of elevators, said guide means and driving means disposed at a doffing position closely positioned to said doffing position of said doffing units, said elevators being circulated around said guide means to carry said doffed packages upwardly and carry them to out of said winding machinery.

16. A doffing apparatus of an automatic winding machine according to claim 14, further comprising a power transmitting mechanism disposed on said winding machinery and said driving means for driving said elevators is driven intermittently by said power transmitting mechanism.

17. A doffing apparatus of an automatic winding machine according to claim 14, wherein said elevators have foldable constructions while returning downward along said guide means.

18. A doffing apparatus of an automatic winding machine according to claim 14, further comprising a conveyor closely disposed to the elevated position of said elevators for receiving said carried packages from said elevators.

References Cited

UNITED STATES PATENTS

| | | | |
|---|---|---|---|
| 1,700,425 | 1/1929 | Abbott et al. | 242—35.6 |
| 3,092,340 | 6/1963 | Furst | 242—35.5 |
| 3,160,359 | 12/1964 | Furst | 242—35.5 |
| 3,184,174 | 5/1965 | Furst | 242—35.5 |

FOREIGN PATENTS 864,648  4/1961  Great Britain.

STANLEY N. GILREATH, Primary Examiner